US011995768B2

United States Patent
Iwaki

(10) Patent No.: US 11,995,768 B2
(45) Date of Patent: May 28, 2024

(54) VR LIVE BROADCASTING DISTRIBUTION SYSTEM, DISTRIBUTION SERVER, CONTROL METHOD FOR DISTRIBUTION SERVER CONTROL METHOD, PROGRAM FOR DISTRIBUTION SERVER, AND DATA STRUCTURE OF VR PICTURE DATA

(71) Applicant: DWANGO Co., Ltd., Tokyo (JP)

(72) Inventor: Shinnosuke Iwaki, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 87 days.

(21) Appl. No.: 17/598,825

(22) PCT Filed: Oct. 24, 2019

(86) PCT No.: PCT/JP2019/041677
§ 371 (c)(1),
(2) Date: Sep. 27, 2021

(87) PCT Pub. No.: WO2020/194821
PCT Pub. Date: Oct. 1, 2020

(65) Prior Publication Data
US 2022/0180601 A1 Jun. 9, 2022

(30) Foreign Application Priority Data
Mar. 27, 2019 (JP) .................................. 2019-059898

(51) Int. Cl.
*G06T 17/10* (2006.01)
*G06T 19/00* (2011.01)
(Continued)

(52) U.S. Cl.
CPC .............. *G06T 17/10* (2013.01); *G06T 19/00* (2013.01); *H04N 21/2187* (2013.01); *H04N 21/4788* (2013.01)

(58) Field of Classification Search
None
See application file for complete search history.

(56) References Cited

U.S. PATENT DOCUMENTS

2002/0007314 A1* 1/2002 Maruyama ............. G06Q 30/02
345/419
2010/0231590 A1* 9/2010 Erceis ..................... G06T 15/04
345/426
2018/0348531 A1* 12/2018 Nakahara ........... H04N 21/2187

FOREIGN PATENT DOCUMENTS

JP H10222698 A 8/1998
JP 2009093478 A 4/2009
(Continued)

OTHER PUBLICATIONS

Endo et al. Translated version of Image display method and device Document ID JP2005327314, Published Nov. 2005 (Year: 2005).*
(Continued)

*Primary Examiner* — Saptarshi Mazumder
(74) *Attorney, Agent, or Firm* — Dorsey & Whitney LLP

(57) ABSTRACT

A VR snapshot broadcasting distribution system, a distribution server, a control method for the distribution server, a program for the distribution server, and a data structure of a VR snapshot data, whereby a 3D space is kept in a 3D form and data of the 3D space is made compact are disclosed. An example distribution server includes: a shooting instruction input unit, to which unit a VR snapshot shooting instruction is input by a distributor or a viewer; an exterior appearance data constructor configured to construct exterior appearance data of the entire 3-dimensional space including the avatar, based on a VR snapshot shooting instruction; a VR snapshot data distribution unit configured to distribute, as VR snapshot data, the exterior appearance data of the entire 3-dimensional space including the avatar, which is constructed (Continued)

by the exterior appearance data constructor; and a display unit configured to display the VR snapshot.

14 Claims, 12 Drawing Sheets

(51) Int. Cl.
*H04N 21/2187* (2011.01)
*H04N 21/4788* (2011.01)

(56) References Cited

FOREIGN PATENT DOCUMENTS

JP    2009301477 A    12/2009
WO    2020194821 A1   10/2020

OTHER PUBLICATIONS

International Search Report and Written Opinion (English Translation only for ISR), dated Dec. 10, 2019, for PCT Application No. PCT/JP2019/041677.
Notice of First Office Action for Chinese Patent Application No. 201980094819.X dated Jun. 17, 2023, pp. all.

\* cited by examiner

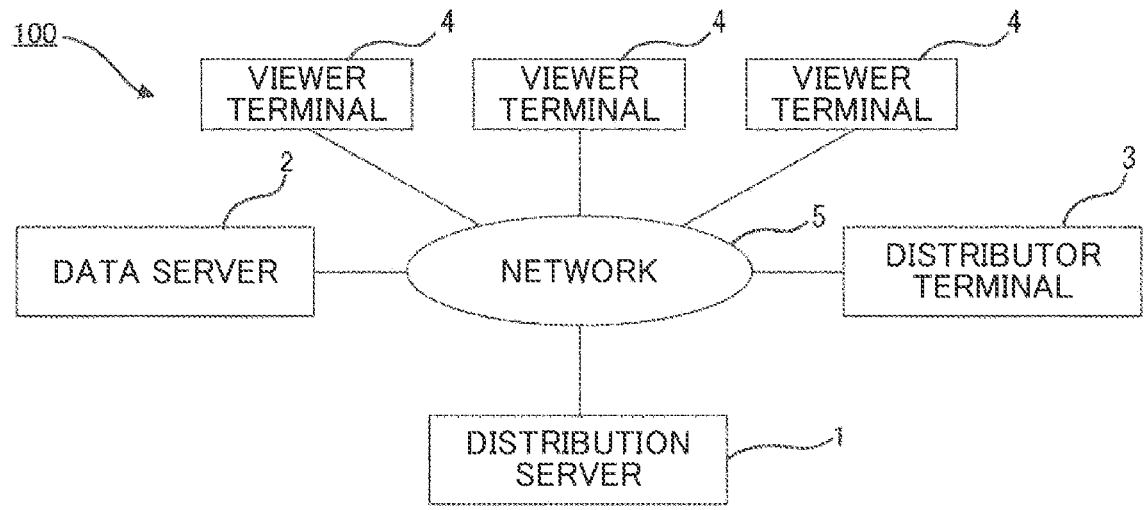
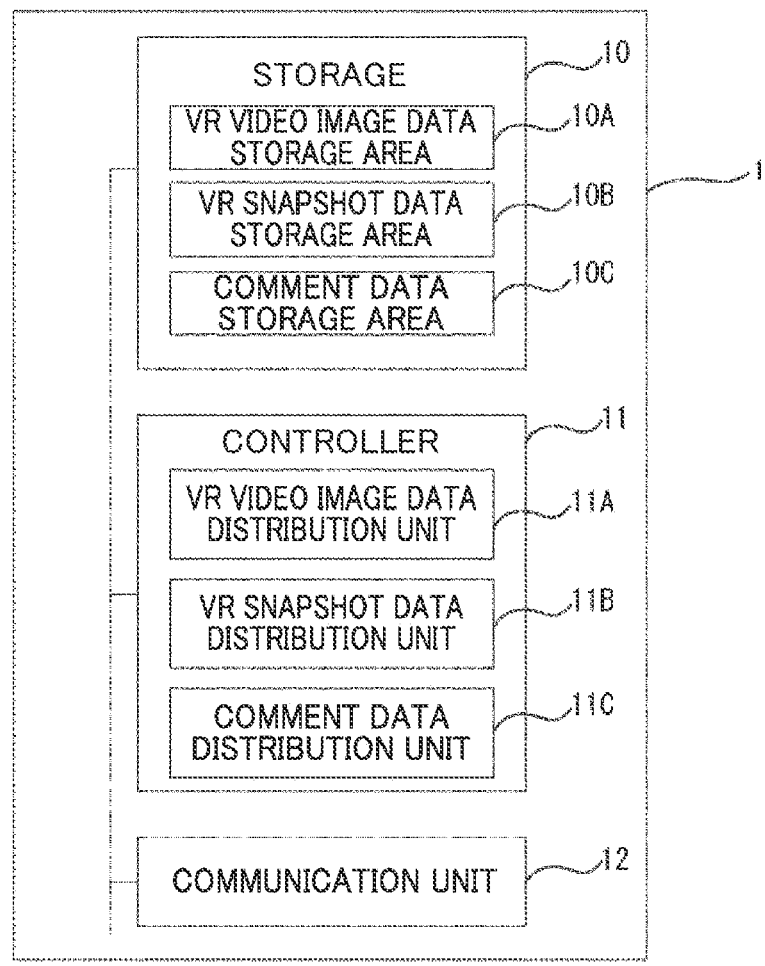

VR LIVE BROADCASTING DISTRIBUTION SYSTEM, DISTRIBUTION SERVER, CONTROL METHOD FOR DISTRIBUTION SERVER CONTROL METHOD, PROGRAM FOR DISTRIBUTION SERVER, AND DATA STRUCTURE OF VR PICTURE DATA

RELATED APPLICATIONS

This application is a 371 National Stage application claiming priority to International Application No. PCT/JP2019/041677, filed Oct. 24, 2019, which claims priority to Japanese Patent Application No. 2019-059898 filed on Mar. 27, 2019. The aforementioned applications are incorporated herein by references, in their entirety, for any purposes.

TECHNICAL FIELD

The present disclosure relates to a VR live broadcasting distribution system, a distribution server, a control method for the distribution server, a program for the distribution server, and a data structure of a VR picture data.

BACKGROUND ART

In a video game including a virtual environment, a user can pause the game and take a 3D snapshot for 3-dimensional (hereinafter, also referred to as 3D) printing. For example, Patent Document 1 discloses a technique of supplementing in-game geometries with supplementary geometries when a 3D snapshot is selected. According to this technique, the components of the virtual game environment are calculated to support a model in a final printed physical form of the model and modified to have structural shapes within a 3D printer geometry.

CITATION LIST

Patent Documents

Patent Document 1: Japanese Unexamined Patent Publication No. 2016-163996

SUMMARY OF THE INVENTION

Technical Problem

Instead of live broadcasting of a video image of a distributor or the like taken by a camera as have been traditionally done, there has been a service of rendering avatar data in motion data of the distributor and live broadcasting a video image of the avatar in a 3D space.

There has also been a platform that allows publishing and sharing of self-created avatar data that can be used in such a service.

The above-mentioned service is intended not only to distribute the video image of the avatar in the 3D space, but also to enable shooting of a commemorative photograph during live broadcast and distributing of the photograph to viewers.

Such a photograph is not a 3D snapshot as in Patent Document 1, but is assumed to be distributed with the 3D space kept in a 3D form. Distributing a 3D photograph enables not only viewing of the avatar and the room where the avatar is located, but also viewing of a house the room is located, from the outside, and viewing of the surrounding scenery and the like from any angle.

However, to distribute such a 3D photograph, it is necessary to make the data to be distributed compact, because the data volume of the entire 3D space is large.

In view of the above, it is an object of the present disclosure to provide a VR snapshot broadcasting distribution system, a distribution server, a control method for the distribution server, a program for the distribution server, and a data structure of a VR snapshot data, whereby a 3D space is kept in a 3D form and data of the 3D space is made compact.

Solution to the Problem

To solve the above-described problem, an aspect of a VR live broadcasting distribution system related to the present disclosure is a VR live broadcasting distribution system, including a distributor terminal, a viewer terminal, and a distribution server, the system being configured to distribute, in a form of live broadcasting, a VR (virtual reality) video image including at least a 3-dimensional computer graphics video image in which avatar data is rendered with motion data and a 3-dimensional computer graphics video image of a 3-dimensional space in which the avatar exists. The VR live broadcasting distribution system includes: a shooting instruction input unit provided to the distributor terminal and the viewer terminal, to which unit a VR snapshot shooting instruction is input by a distributor or a viewer, an exterior appearance data constructor provided to at least one of the distributor terminal or the distribution server, the exterior appearance data constructor configured to construct exterior appearance data of the entire 3-dimensional space including the avatar, based on the shooting instruction; a VR snapshot data distribution unit provided to at least one of the distributor terminal or the distribution server, the VR snapshot data distribution unit configured to distribute, as VR snapshot data, the exterior appearance data of the entire 3-dimensional space including the avatar, which is constructed by the exterior appearance data constructor; and a display unit provided to the distributor terminal and the viewer terminal, the display unit configured to display the VR snapshot.

The "exterior appearance data of the entire 3-dimensional space including the avatar" herein is a concept including coordinate data and texture data (including colors) of surfaces of all objects in the 3-dimensional space, without distinguishing the avatar from other objects such as furniture.

With the above aspect, when the VR snapshot shooting instruction is input by the distributor or the viewer through the shooting instruction input unit, the exterior appearance data constructor constructs the exterior appearance data of the entire 3-dimensional space including the avatar, based on the VR snapshot shooting instruction. The VR snapshot data distribution unit distributes, as VR snapshot data, the exterior appearance data of the entire 3-dimensional space including the avatar, which is constructed by the exterior appearance data constructor. In the distributor terminal and the viewer terminal, the display unit displays the VR snapshot. As thus described, the VR snapshot image is not an image generated by cutting out a single frame of a captured VR video image, but a VR image generated based on the VR snapshot data. Therefore, the viewer and the distributor can view the VR snapshot image while rotating the VR snapshot image and changing the angle. Further, since the VR snapshot image is based on the VR snapshot data stored in the 3D form, the viewer and the distributor can change the angle of viewing the VR snapshot to view a so-called far-shot image.

Further, since the VR snapshot image is based on the VR snapshot data as described above, the 3D space can be kept and distributed as 3D data, not as a captured picture. Although the data volume of the entire 3D space is large, the VR snapshot data is generated and distributed by cutting out the coordinate data and the texture data (including colors) of surfaces of all the objects in the entire 3-dimensional space including the avatar. Therefore, the load on the distribution server can be reduced.

In another aspect of the VR live broadcasting distribution system according to the present disclosure, the VR snapshot data distribution unit may distribute the VR snapshot data in which a data volume of data for a far view in the 3-dimensional space is reduced, the far view being a view at least a predetermined distance away from a predetermined reference position. Examples of the data in which a data volume include reduced is 2-dimensional image data. With this aspect, the VR snapshot data to be distributed can be simplified and the load on the distribution server can be further reduced.

To solve the above-described problem, an aspect of a distribution server related to the present disclosure is a distribution server in a VR live broadcasting distribution system including a distributor terminal, a viewer terminal, and the distribution server, the system being configured to distribute, in a form of live broadcasting, a VR video image including a video image in which avatar data is rendered with motion data and a video image of a 3-dimensional space in which the avatar exists. The distribution server includes: an exterior appearance data constructor configured to construct exterior appearance data of the entire 3-dimensional space including the avatar, based on a VR snapshot shooting instruction from the distributor terminal or the viewer terminal; and a VR snapshot data distribution unit configured to distribute, as VR snapshot data, the exterior appearance data of the entire 3-dimensional space including the avatar, which is constructed by the exterior appearance data constructor.

According to the above aspect, the exterior appearance data constructor constructs exterior appearance data of the avatar from the avatar data, based on a VR snapshot shooting instruction. The VR snapshot data distribution unit distributes, as VR snapshot data, the exterior appearance data of the entire 3-dimensional space including the avatar, which is constructed by the exterior appearance data constructor. As thus described, the VR snapshot image is not an image generated by cutting out a single frame of a captured VR video image, but a VR image generated based on the VR snapshot data. Therefore, the viewer and the distributor can view the VR snapshot image while rotating the VR snapshot image and changing the angle. Further, since the VR snapshot image is based on the VR snapshot data stored in the 3D form, the viewer and the distributor can change the angle of viewing the VR snapshot to view a so-called far-shot image. Further, since the VR snapshot image is based on the VR snapshot data as described above, the 3D space can be kept and distributed as 3D data, not as a captured picture. Although the data volume of the entire 3D space is large, the VR snapshot data is generated and distributed by cutting out the coordinate data and the texture data (including colors) of surfaces of all the objects in the entire 3-dimensional space including the avatar. Therefore, the load on the distribution server can be reduced.

In another aspect of the distribution server according to the present disclosure, the VR snapshot data distribution unit may distribute the VR snapshot data in which a data volume of data for a far view in the 3-dimensional space is reduced, the far view being a view at least a predetermined distance away from a predetermined reference position. With this aspect, the VR snapshot data to be distributed can be simplified and the load on the distribution server can be further reduced.

Another aspect of the distribution server according to the present disclosure may include: a video image receiver configured to receive from the distributor terminal a captured video image in which the VR video image is captured; and a video image distribution unit configured to distribute the captured video image to the viewer terminal. With this aspect, a captured video image in which the VR video image is captured is distributed during the live broadcasting of the VR video image, the load on the distribution server can be reduced.

Another aspect of the distribution server according to the present disclosure may include: a comment receiver configured to receive a comment by a viewer transmitted from the viewer terminal; a comment storage configured to store the comment received; and a comment distribution unit configured to distribute the comment received to the viewer terminal. With this aspect, a comment input by the viewer is objectified and distributed during live broadcasting of the VR video image, so as to enable viewing of the comment as the VR snapshot.

To solve the above-described problem, an aspect of a control method for a distribution server related to the present disclosure is a control method for a distribution server in a VR live broadcasting distribution system, including a distributor terminal, a viewer terminal, and a distribution server, the system configured to distribute, in a form of live broadcasting, a VR (virtual reality) video image including at least a 3-dimensional computer graphics video image in which avatar data is rendered with motion data and a 3-dimensional computer graphics video image of a 3-dimensional space in which the avatar exists. The method includes: constructing, using an exterior appearance data constructor, exterior appearance data of the entire 3-dimensional space including the avatar, based on a VR snapshot shooting instruction from the distributor terminal or the viewer terminal; and distributing, using a VR snapshot data distribution unit, as VR snapshot data, the exterior appearance data of the entire 3-dimensional space including the avatar, which is constructed by the exterior appearance data constructor.

According to the above aspect of the control method for the distribution server, the exterior appearance data constructor constructs exterior appearance data of the avatar from the avatar data, based on a VR snapshot shooting instruction. The VR snapshot data distribution unit distributes, as VR snapshot data, the exterior appearance data of the entire 3-dimensional space including the avatar, which is constructed by the exterior appearance data constructor. As described, the VR snapshot image is not an image generated by cutting out a single frame of a captured VR video image, but a VR image generated based on the VR snapshot data. Therefore, the viewer and the distributor can view the VR snapshot image while rotating the VR snapshot image and changing the angle. Further, since the VR snapshot image is based on the VR snapshot data stored in the 3D form, the viewer and the distributor can change the angle of viewing the VR snapshot to view a so-called far-shot image. Further, since the VR snapshot image is based on the VR snapshot data as described above, the 3D space can be kept and distributed as 3D data, not as a captured picture. Although the data volume of the entire 3D space is large, the VR snapshot data is generated and distributed by cutting out the coordinate data and the texture data (including colors) of surfaces of all the objects in the entire 3-dimensional space including the avatar. Therefore, the load on the distribution server can be reduced.

To solve the above-described problem, an aspect of a program for a distribution server related to the present disclosure is a program for a distribution server in a VR live broadcasting distribution system, including a distributor terminal, a viewer terminal, and a distribution server, the system configured to distribute, in a form of live broadcasting, a VR (virtual reality) video image including at least a 3-dimensional computer graphics video image in which avatar data is rendered with motion data and a 3-dimensional computer graphics video image of a 3-dimensional space in which the avatar exists. The program configured to cause a computer to execute a process including: constructing, using an exterior appearance data constructor, exterior appearance data of the entire 3-dimensional space including the avatar, based on a VR snapshot shooting instruction from the distributor terminal or the viewer terminal; and distributing, using a VR snapshot data distribution unit, as VR snapshot data, the exterior appearance data of the entire 3-dimensional space including the avatar, which is constructed by the exterior appearance data constructor.

According to the above aspect of the program for the distribution server, the exterior appearance data constructor constructs exterior appearance data of the avatar from the avatar data, based on a VR snapshot shooting instruction. The VR snapshot data distribution unit distributes, as VR snapshot data, the exterior appearance data of the entire 3-dimensional space including the avatar, which is constructed by the exterior appearance data constructor. As described, the VR snapshot image is not an image generated by cutting out a single frame of a captured VR video image, but a VR image generated based on the VR snapshot data. Therefore, the viewer and the distributor can view the VR snapshot image while rotating the VR snapshot image and changing the angle. Further, since the VR snapshot image is based on the VR snapshot data stored in the 3D form, the viewer and the distributor can change the angle of viewing the VR snapshot to view a so-called far-shot image. Further, since the VR snapshot image is based on the VR snapshot data as described above, the 3D space can be kept and distributed as 3D data, not as a captured picture. Although the data volume of the entire 3D space is large, the VR snapshot data is generated and distributed by cutting out the coordinate data and the texture data (including colors) of surfaces of all the objects in the entire 3-dimensional space including the avatar. Therefore, the load on the distribution server can be reduced.

To solve the above-described problem, an aspect of a data structure of a VR snapshot data related to the present disclosure is a data structure of a VR snapshot data distributed from a distributor terminal or a distribution server in a VR live broadcasting distribution system including the distributor terminal, a viewer terminal, and the distribution server, the system configured to distribute, in a form of live broadcasting, a VR (virtual reality) video image including at least a 3-dimensional computer graphics video image in which avatar data is rendered with motion data and a 3-dimensional computer graphics video image of a 3-dimensional space in which the avatar exists. The data structure includes at least an exterior appearance data of the entire 3-dimensional space including the avatar.

According to the above aspect of the data structure of the VR snapshot data, the VR snapshot image is generated based on the VR snapshot data. Therefore, the viewer and the distributor can view the VR snapshot image while rotating the VR snapshot image and changing the angle. Further, since the VR snapshot image is based on the VR snapshot data stored in the 3D form, the viewer and the distributor can change the angle of viewing the VR snapshot to view a so-called far-shot image. Further, since the VR snapshot image is based on the VR snapshot data as described above, the 3D space can be kept and distributed as 3D data, not as a captured picture. Although the data volume of the entire 3D space is large, the VR snapshot data is generated and distributed by cutting out the coordinate data and the texture data (including colors) of surfaces of all the objects in the entire 3-dimensional space including the avatar. Therefore, the load on the distribution server can be reduced.

Advantages of the Invention

With the present disclosure, a 3D space is kept in a 3D form as a VR snapshot, and data thereof the 3D space is made compact.

BRIEF DESCRIPTION OF THE DRAWINGS

FIG. 1 is a diagram schematically showing a VR live broadcasting distribution system according to a first embodiment of the present disclosure.

FIG. 2 is a block diagram schematically showing a configuration of a distribution server according to the first embodiment.

DESCRIPTION OF EMBODIMENTS

First Embodiment

Figure 3:
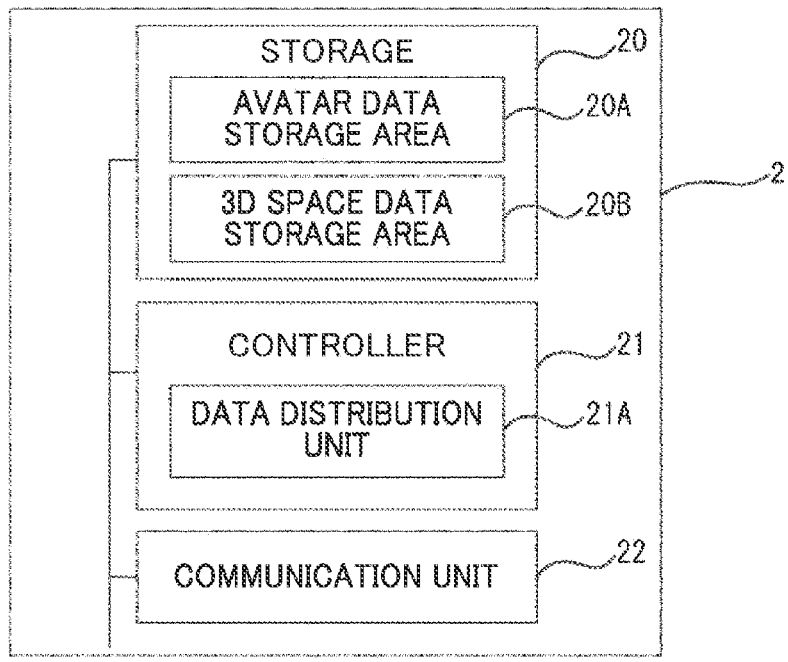
FIG. 3 is a block diagram schematically showing a configuration of a data server according to the first embodiment.
Figure 4:
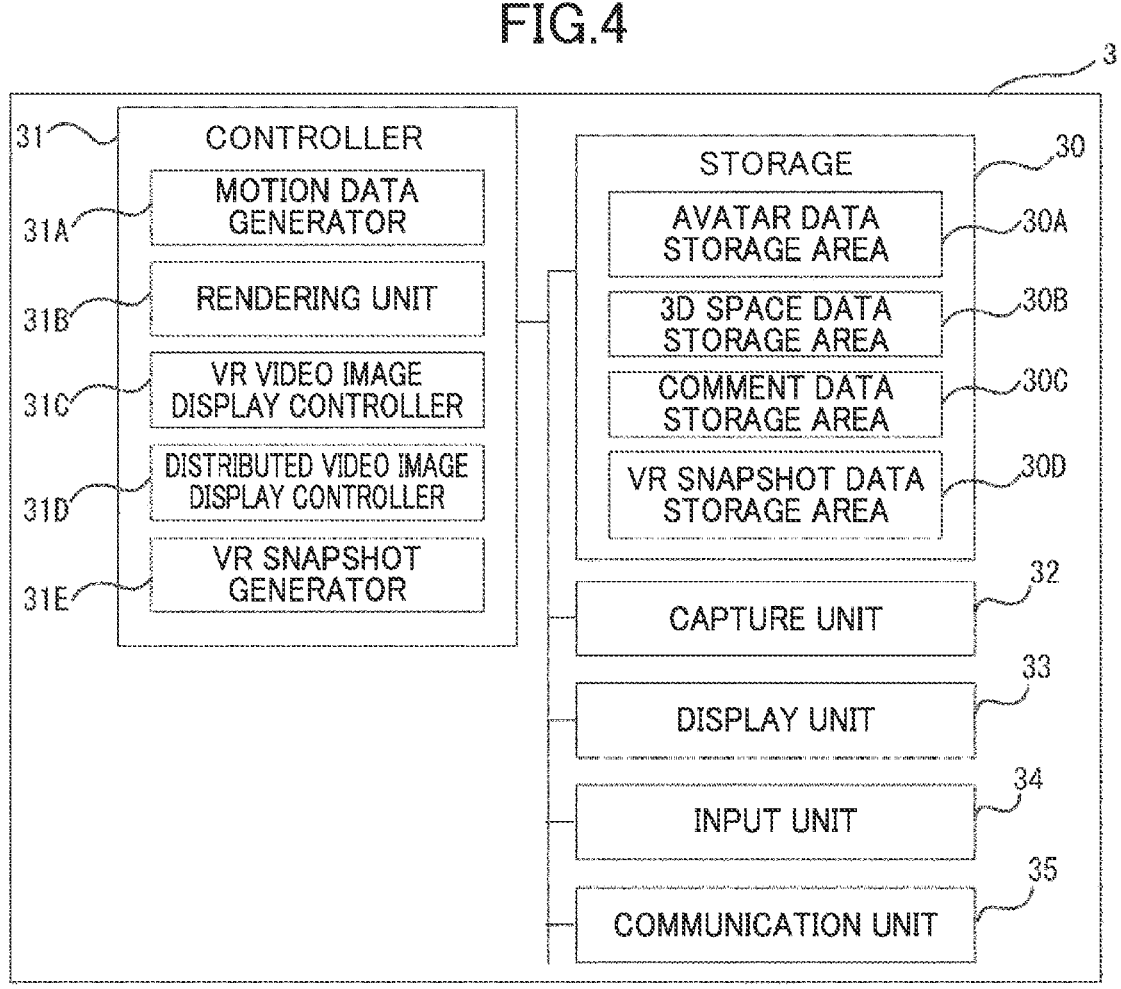
FIG. 4 is a block diagram schematically showing a configuration of a distributor terminal according to the first embodiment.
Figure 5:
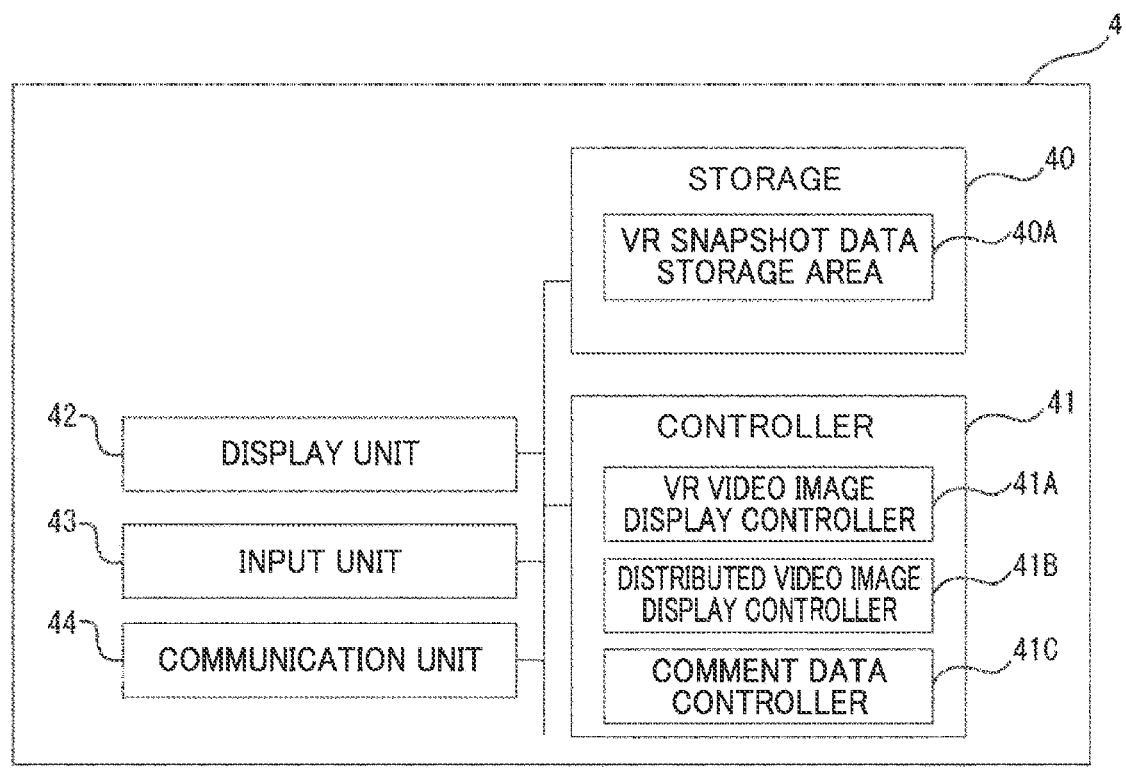
FIG. 5 is a block diagram schematically showing a configuration of a viewer terminal according to the first embodiment.

A first embodiment of the present disclosure will be described hereinbelow, with reference to the drawings. FIG. 1 is a diagram schematically showing a VR live broadcasting distribution system according to the first embodiment. FIG. 2 is a block diagram schematically showing a configuration of a distribution server according to the first embodiment. FIG. 3 is a block diagram schematically showing a configuration of a data server according to the first embodiment. FIG. 4 is a block diagram schematically showing a configuration of a distributor terminal according to the first embodiment. FIG. 5 is a block diagram schematically showing a configuration of a viewer terminal according to the first embodiment.

(VR Live Broadcasting Distribution System)

As shown in FIG. 1, the VR live broadcasting distribution system 100 according to the present embodiment includes a distribution server 1, a data server 2, a distributor terminal 3, viewer terminals 4, and a network 5 such as the Internet. The distribution server 1 is capable of communicating with the distributor terminal 3 and the viewer terminals 4 via the network 5. The distributor terminal 3 is capable of communicating with not only the distribution server 1 but also the data server 2 via the network 5.

Although a plurality of distributor terminals 3 and viewer terminals 4 can be connected to the network 5, the present embodiment will be described referring to an example in which a single distributor terminal 3 is connected to the network 5, for the sake of simplicity.

As shown in FIG. 2, the distribution server 1 includes a storage 10, a controller 11, and a communication unit 12. The storage 10 is a hard disk drive (HDD) or the like, for example. The storage 10 stores a program for the distribution server 1 of the present disclosure. Further, the storage 10 includes a VR video image data storage area 10A, a VR snapshot data storage area 10B, and a comment data storage area 10C.

The VR video image data storage area 10A stores video image data capturing VR video images, including video images of 3-dimensional computer graphics (hereinafter, also referred to as 3DCG) of avatars transmitted from the distributor terminal 3. The VR snapshot data storage area 10B stores VR snapshot data transmitted from the distributor terminal 3. The comment data storage area 10C serving as a comment storage stores comment data transmitted from the viewer terminals 4. VR video images, video images capturing VR video images, VR snapshots, and the comments will be detailed later.

The controller 11 is configured by a CPU or the like, and controls operation of the entire distribution server 1. The operation of storing the above-described data in the storage 10 is also performed under the control of the controller 11. Further, the controller 11 has functions of a VR video image data distribution unit 11A as a video image distribution unit, a VR snapshot data distribution unit 11B, and a comment data distribution unit 11C as a comment distribution unit.

The VR video image data distribution unit 11A distributes video image data obtained by capturing a VR video image stored in the VR video image data storage area 10A of the storage 10 to the distributor terminal 3 and the viewer terminals 4 via the communication unit 12.

The VR snapshot data distribution unit 11B distributes VR snapshot data stored in the VR snapshot data storage area 10B of the storage 10 to the distributor terminal 3 and the viewer terminals 4 via the communication unit 12.

The comment data distribution unit 11C distributes comment data stored in the comment data storage area 10C of the storage 10 to the distributor terminal 3 via the communication unit 12.

The communication unit 12 is an interface that performs data communication via the network 5. The present embodiment deals with a case where the Internet is adopted as an exemplary network 5, and the communication unit 12 is an interface that performs data communication via the Internet. The distribution server 1 is capable of communicating with the distributor terminal 3 and the viewer terminals 4 via the network 5.

<Data Server>

As shown in FIG. 3, the data server 2 includes a storage 20, a controller 21, and a communication unit 22. The storage 20 is a hard disk drive (HDD) or the like, for example. The storage 20 stores a program for the data server 2. Further, the storage 20 includes an avatar data storage area 20A and a 3D space data storage area 20B.

The avatar data storage area 20A stores avatar data of virtual characters transmitted from the distributor terminal 3 or any of the viewer terminals 4, or from a terminal (not shown) of a user other than those of the distributor terminal 3 and the viewer terminals 4. The 3D space data storage area 20B stores 3D space data transmitted from the distributor terminal 3 or any of the viewer terminals 4, or from a terminal (not shown) of a user other than those of the distributor terminal 3 and the viewer terminals 4. The avatar data and the 3D space data are detailed later.

The controller 21 is configured by a CPU or the like, and controls operation of the entire data server 2. The operation of storing the above-described data in the storage 20 is also performed under the control of the controller 21. The controller 21 has a function as a data distribution unit 21A.

The data distribution unit 21A distributes the avatar data of virtual characters stored in the avatar data storage area 20A of the storage 20 and the 3D space data stored in the 3D space data storage area 20B of the storage 20 to the distributor terminal 3 via the communication unit 22.

The communication unit 22 is an interface that performs data communication via the network 5. The present embodiment deals with a case where the Internet is adopted as an exemplary network 5, and the communication unit 22 is an interface that performs data communication via the Internet. The data server 2 is capable of communicating with the distributor terminal 3, the viewer terminals 4, or a terminal of a user other than the users of the distributor terminal 3 and the viewer terminals 4 via the network 5.

<Distributor Terminal>

As shown in FIG. 4, the distributor terminal 3 includes a storage 30, a controller 31, a capture unit 32, a display unit 33, an input unit 34, and a communication unit 35. The storage 30 is a hard disk drive (HDD) or the like, for example. The storage 30 stores a program for the distributor terminal 3. The storage 30 includes an avatar data storage area 30A, a 3D space data storage area 30B, a comment data storage area 30C, and a VR snapshot data storage area 30D. Examples of the distributor terminal 3 include devices such as a personal computer and a head-mountable display.

The avatar data storage area 30A stores the avatar data pf a virtual character the user of the distributor terminal 3 (hereinafter, also referred to as distributor) has obtained from the data server 2. The 3D space data storage area 30B stores 3D space data the distributor has obtained from the data server 2. The comment data storage area 30C stores comment data distributed from the distribution server 1. The VR snapshot data storage area 30D stores VR snapshot data transmitted from the distribution server 1.

The controller 31 is configured by a CPU or the like, and controls operation of the entire distributor terminal 3. The operation of storing the above-described data in the storage 30 is also performed under the control of the controller 31. Further, the controller 31 has functions of a motion data generator 31A, a rendering unit 31B, a VR video image display controller 31C, a distributed video image display controller 31D, and a VR snapshot generator 31E.

The motion data generator 31A generates motion data representing a physical motion of the distributor in the form of 3-dimensional time series data, which data is obtained by measuring coordinates of each part of the distributor's body through motion capturing using controllers (not shown, the same applies hereinbelow) worn on hands, fingers, and the like of the distributor, and a VR headset (not shown, the same applies hereinbelow) worn on the head of the distributor.

The rendering unit 31B performs a rendering process of linking the avatar data stored in the avatar data storage area 30A with the motion data generated by the motion data generator 31A.

The VR video image display controller 31C performs control to display a VR video image including 3DCG of an avatar in a 3D space, by using the 3D space data stored in the 3D space data storage area 30B, the comment data stored in the comment data storage area 30C, and avatar data rendered. The VR video image is displayed on the display unit 33 and the VR headset connected to the display unit 33.

Further, the VR video image display controller 31C displays a video image of a VR snapshot on the display unit 33 and the VR headset connected to the display unit 33, based on the VR snapshot data distributed from the distribution server 1 and stored in the VR snapshot data storage area 30D.

The distributed video image display controller 31D displays a video image in which a VR video image is captured, the video image distributed from the distribution server 1, on the display unit 33 and the VR headset connected to the display unit 33.

The VR snapshot generator 31E generates VR snapshot data based on VR video image data of the 3D space, the avatar, and the comment displayed at a time of pressing or clicking a shutter button provided to an input unit 34 serving as a shooting instruction input unit or a controller (not shown) connected to the input unit 34. The VR snapshot generator 31E also generates the VR snapshot data at a time of pressing or clicking a shutter button provided to the viewer terminal 4.

The capture unit 32 captures, as video image data, the VR video image displayed on the display unit 33 and the VR headset connected to the display unit 33, and transmits the captured video image data to the distribution server 1 via the communication unit 35.

The display unit 33 includes a display and a display circuit, and the VR headset is connectable to the display unit 33.

The input unit 34 includes a keyboard, a pointing device such as a mouse, and an interface for data input. To the input unit 34, a controller for performing motion capturing is connected.

The communication unit 35 is an interface that performs data communication via the network 5. The present embodiment deals with a case where the Internet is adopted as an exemplary network 5, and the communication unit 35 is an interface that performs data communication via the Internet. The distributor terminal 3 is capable of communicating with the distribution server 1 and the data server 2 via the network 5.

<Viewer Terminal>

As shown in FIG. 5, the viewer terminal 4 includes a storage 40, a controller 41, a display unit 42, an input unit 43, and a communication unit 44. Examples of the viewer terminal 4 include devices such as a personal computer.

The storage 40 is a hard disk drive (HDD) or the like, for example. The storage 40 stores a program for the viewer terminal 4. The storage 40 includes a VR snapshot data storage area 40A. The VR snapshot data storage area 40A stores VR snapshot data transmitted from the distribution server 1.

The controller 41 is configured by a CPU or the like, and controls operation of the entire viewer terminal 4. The operation of storing the VR snapshot data in the storage 40 is also performed under the control of the controller 41. The control unit 41 has functions as a VR video image display controller 41A, a distributed video image display controller 41B, and a comment data controller 41C.

Further, the VR video image display controller 41A performs control to display a video image of a VR snapshot on the display unit 33, based on the VR snapshot data stored in the VR snapshot data storage area 40A.

The distributed video image display controller 41B displays, on the display unit 42, a VR video image of the avatar in the 3D space with comments, capture in the distributor terminal 3 and distributed to the distribution server 1, and then again distributed from the distribution server 1.

The comment data controller 41C transmits, to the distribution server 1 via the communication unit 44, comment data input by a user (viewer) of the viewer terminal 4 via the input unit 43.

The display unit 42 includes a display and a display circuit, and displays the VR video image of the avatar including the 3D space and comments, as well as the video image of the VR snapshot.

The input unit 43 includes a keyboard, a pointing device such as a mouse, and an interface for data input.

The communication unit 44 is an interface that performs data communication via the network 5. The present embodiment deals with a case where the Internet is adopted as an exemplary network 5, and the communication unit 44 is an interface that performs data communication via the Internet. The viewer terminal 4 is capable of communicating with the distribution server 1 via the network 5.

<Distribution of VR Video Image>

(1) Data Selection

Next, the following describes distribution of a VR video image, according to the present embodiment. To distribute a VR video image, the distributor first accesses a platform for avatars (hereinafter, avatar platform) by using the distributor terminal 3, selects an avatar of a virtual character, and obtains avatar data.

The avatar platform can be accessed by a web browser. An avatar creator accesses a web browser, by using a terminal device similar to the distributor terminal 3 and the viewer terminal 4, and uploads avatar data of the created avatar to the data server 2.

The avatar data includes polygon data, texture data forming the outer surface of the virtual character, and bone data. These sets of data are stored in the avatar data storage area 20A of the storage 20 in the data server 2, in a predetermined file format such as VRM.

In the avatar platform, sets of avatar data uploaded are listed in the form of icons or eye-catch images. The user of the distributor terminal 3 can access the avatar platform with a web browser, select an avatar from the list of icons or eye-catch images, and download the avatar data to the distributor terminal 3. In this case, the controller 31 of the distributor terminal 3 stores the downloaded avatar data in the avatar data storage area 30A of the storage 30.

The avatar platform allows not only selection of avatar data, but also selection of a 3D space expressing a room and the like in which the avatar of a virtual character exists, and selection of data related to accessories such as flowers and the like in the room and the like. These sets of data are also stored in the avatar data storage area 20A of the storage 20 in the data server 2, in a predetermined file format such as VRM.

The distributor can access the avatar platform with a web browser, select a 3D space or accessory data from a list of icons or eye-catch images, and download these sets of data to the distributor terminal 3. In this case, the controller 31 of the distributor terminal 3 stores the downloaded data in the 3D space data storage area 30B of the storage 30.

(2) Distribution of VR Video Image

To distribute a VR video image, the distributor downloads and installs in advance a VR studio application program and an encoder application program for capturing and displaying a studio generated by the VR studio application, to the distributor terminal 3.

The VR studio application program is an application program for creating a studio in a VR space. The encoder application program is an application program for an encoder that captures the state of the studio created by the VR studio application program and projects the captured state on the distribution platform.

To distribute a VR video image, the distributor starts the VR studio application program. At this time, the distributor terminal 3 is connected to the VR headset and the controller.

The distributor selects avatar data downloaded in advance, and further selects 3D space data, and accessory data as needed.

When the above described selections are performed, the rendering unit 31B of the distributor terminal 3 performs a rendering process of linking the avatar data stored in the avatar data storage area 30A with the motion data generated by the motion data generator 31A. Further, the VR video image display controller 31C of the distributor terminal 3 performs control to display a VR video image of an avatar in the 3D space, by using 3D space data stored in the 3D space data storage area 30B, and the avatar data rendered. The VR video image is displayed on the display unit 33 and the VR headset connected to the display unit 33.

The motion of the avatar reflects the positions of the controllers on both hands of the distributor in addition to the VR headset worn on the head of the distributor. When the controller has a track pad, the facial expression of the avatar can be changed by operating the track pad.

The motion of the VR headset and the controller is used for generating motion data by the motion data generator 31A of the distributor terminal 3. The motion data is data that stores each of various motions of the user wearing the VR headset and the controller. Specifically, the motion data is data indicating time-series changes in positions of joints constituting bone data and positions of bones connected to the joints.

Therefore, applying the motion data to the avatar data causes the avatar to make various actions such as walking, running, waving, performing dance steps, and the like in accordance with the movement of the distributor.

The rendering unit 31B of the distributor terminal 3 performs a rendering process of linking the avatar data with the motion data as hereinabove described. The VR video image display controller 31C of the distributor terminal 3 displays a VR video image of the avatar in the 3D space, by using the avatar data rendered.

Next, when the distributor presses a distribution button displayed in the VR studio application program, the video images of the avatar, the 3D space, and the accessories displayed in the VR space as described above are captured by the capture unit 32 of the distributor terminal 3. The capture unit 32 performs a capturing operation with the encoder application program, as described hereinabove. The video images of the captured avatars and the like are distributed from the distributor terminal 3 to the distribution server 1 by the distributed video image display controller 31D of the distributor terminal 3. The distributed video image display controller 31D operates by accessing the distribution platform from the distributor terminal 3. The distribution platform is accessible through a web browser.

A VR video image distribution unit 11A of the distribution server 1 distributes video images of the avatars and the like distributed from a distributor terminal 3 to the viewer terminals 4. The distributed video image display controller 41B of each viewer terminal 4 displays, on the display unit 42, the video images of avatars and the like distributed from the distribution server 1. This way, the viewer can view video images of the avatar and the like that move in response to the movement of the user of the distributor terminal 3.

Further, the viewer can input a comment by using the input unit 43 of the viewer terminal 4 while viewing the video images of the avatar and the like. The comment input is transmitted to the distribution server 1 via the communication unit 44 by the comment data controller 41C of the viewer terminal 4.

The comment data distribution unit 11C of the distribution server 1 stores the comment data received from the viewer terminal 4 in the comment data storage area 10C of the storage 10, and further distributes the comment data to the distributor terminal 3.

The controller 31 of the distributor terminal 3 stores the comment received from the distribution server 1 in the comment data storage area 30C of the storage 30. The VR video image display controller of the distributor terminal 3 displays the comment objectified based on the comment data so as to move, for example, in the VR space.

The video images of the avatars, the 3D space, the accessories, and the comments displayed in the VR space are captured by the capture unit 32 of the distributor terminal 3. The video images of the avatars and the like including the captured comments are distributed from the distributor terminal 3 to the distribution server 1 by the distributed video image display controller 31D of the distributor terminal 3.

A VR video image distribution unit 11A of the distribution server 1 distributes video images of the avatars and the like including the comments, which are distributed from a distributor terminal 3, to the viewer terminals 4. The distributed video image display controller 41B of each viewer terminal 4 displays, on the display unit 42, the video images of avatars and the like including the comments, which are distributed from the distribution server 1. This way, the viewer can view a video image of the avatar and the like that move in response to the movement of the user of the distributor terminal 3, along with a comment input by the viewer and having been objectified.

<Generation of VR Snapshot>

Next, the following describes generation of a VR snapshot, according to the present embodiment. The present embodiment allows a VR snapshot to be generated while VR video images of an avatar and the like are distributed. Unlike a picture generated by cutting out a single frame of the captured VR video images, the VR snapshot is a picture that resembles to a 3D diorama of the entire 3D space, which is generated by cutting out coordinate data and texture data (including colors) of the surfaces of all objects in the 3D space at the very moment the shutter button is pressed. That is, when the VR snapshot is generated, the avatar is not distinguished from other objects such as furniture.

Figure 6:
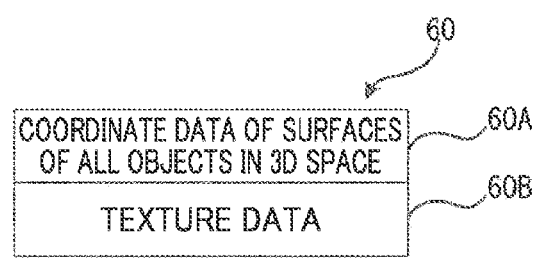
FIG. 6 is a diagram schematically showing a data structure of VR snapshot data.

As shown in FIG. 6, VR snapshot data 60 of the present embodiment includes coordinate data 60A of the surfaces of all objects in the 3D space at the very moment the shutter button is pressed, and texture data 60B (including colors) of that same moment. The VR snapshot data 60 therefore does not include the polygon data, the motion data, and the bone data.

Figure 7:
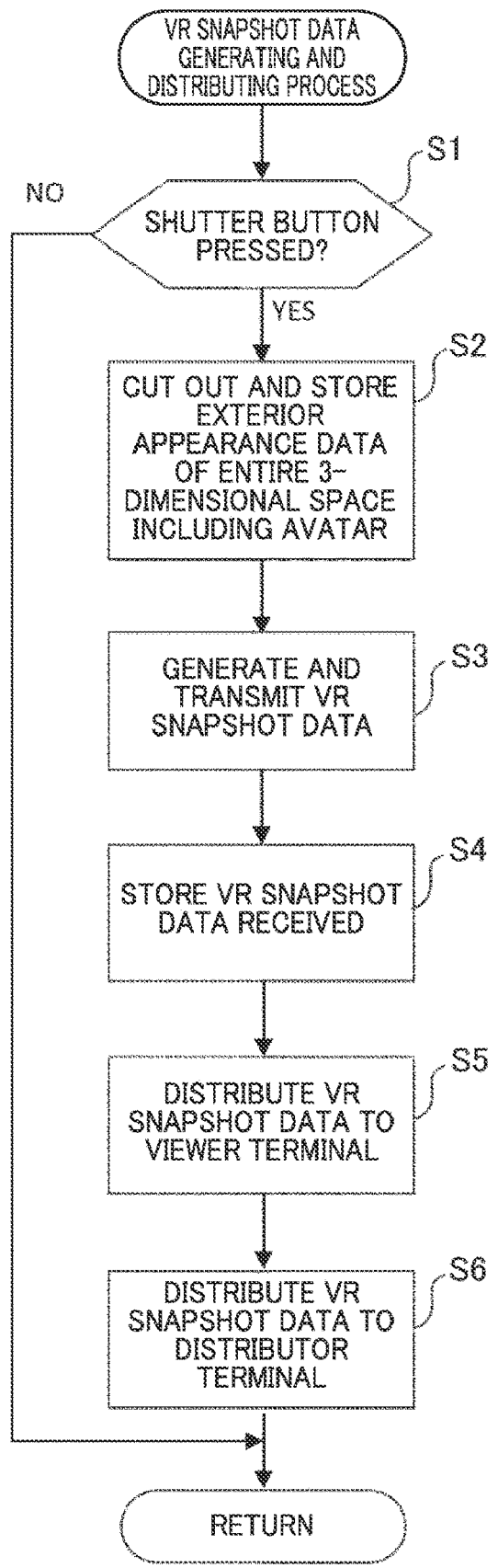
FIG. 7 is a flowchart showing a process of generating VR snapshot data.

Next, a process of generating and distributing the VR snapshot data according to the present embodiment is described with reference to the flowchart of FIG. 7. FIG. 7 is a flowchart showing a process of generating and distributing the VR snapshot data.

The present embodiment assumes that the VR studio application program is downloaded and installed not only in the distributor terminal 3 but also in the viewer terminal 4. When the VR studio application program is started in the distributor terminal 3 or the viewer terminal 4, a shutter button is displayed in the VR studio application program. When the user of the distributor terminal 3 or the viewer terminal 4 presses this shutter button (FIG. 7: S1; YES), generation of a VR snapshot is started.

The shutter button may be provided only in the VR studio application program of the distributor terminal 3. The user of the distributor terminal 3, in this case, may press the shutter button in response to a request from the user of the viewer terminal 4 or a cue given by the user of the distributor terminal 3.

When the above-described shutter button is pressed, the VR snapshot data generator 31E serving as an exterior appearance data constructor of the distributor terminal 3 cuts out the exterior appearance data of the entire 3D space including the avatar and stores the exterior appearance data in the VR snapshot data storage area 30D of the storage 30 in the distributor terminal 3 (FIG. 7: S2).

The VR snapshot data generator 31E of the distributor terminal 3 generates VR snapshot data from the exterior appearance data of the entire 3D space including the avatar, the exterior appearance data having been stored in the VR snapshot data storage area 30D, and transmits the VR snapshot data to the distribution server 1 via the communication unit 35 (FIG. 7: S3).

The VR snapshot data distribution unit 11B of the distribution server 1 stores the VR snapshot data from the distributor terminal 3 in the VR snapshot data storage area 10B of the storage 10 (FIG. 7: S4), and further distributes the VR snapshot data to the viewer terminals 4 and the distributor terminal 3 via the communication unit 12 (FIG. 7: S5, S6).

The controller 41 of each viewer terminal 4 stores the VR snapshot data from the distribution server 1 in the VR snapshot data storage area 40A of the storage 40 in the viewer terminal 4. Further, the VR video image display controller 41A of the viewer terminal 4 generates the VR snapshot image of the avatar based on the VR snapshot data stored in the VR snapshot data storage area 40A, and displays the VR snapshot image on the display unit 42. Further, the VR video image display controller 41A displays the VR snapshot images of the 3D space, and if any, the accessory and comment on the display unit 42, based on the VR snapshot data.

The VR video image display controller 31C of the distributor terminal 3 generates the VR snapshot image of the entire 3D space including the avatar, based on the VR snapshot data stored in the VR snapshot data storage area 30D of the storage 30 in the distributor terminal 3, and displays the VR snapshot image on the display unit 33 and the VR headset connected to the display unit 33.

Figure 8:
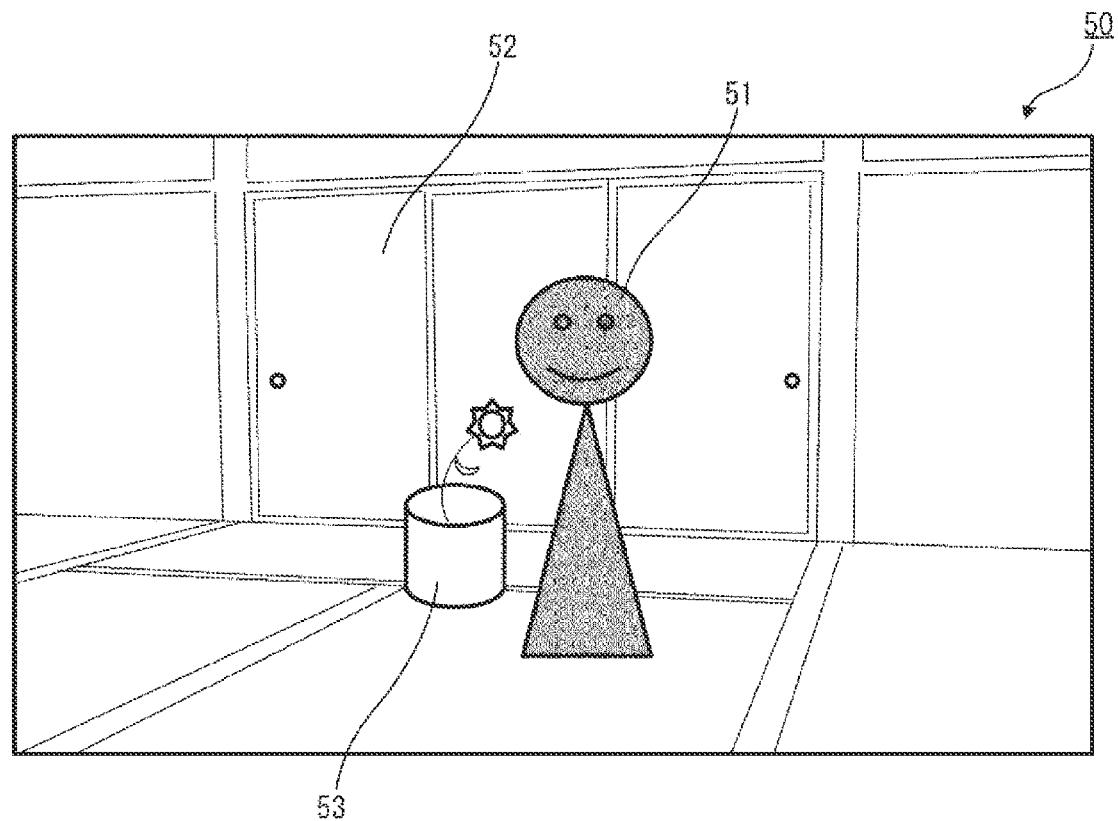
FIG. 8 is a diagram showing an exemplary VR snapshot image displayed on the viewer terminal and the distributor terminal.

FIG. 8 is a diagram showing an exemplary VR snapshot image 50 displayed on the viewer terminal 4 and the distributor terminal 3. As shown in FIG. 8, the VR snapshot image 50 includes images of an avatar 51, a room 52 as the 3D space, and a flower 53 as the accessory. The example of FIG. 8 omits an image of the comment.

As hereinabove described, the VR snapshot image 50 is not an image generated by cutting out a single frame of a captured VR video image, but a VR image generated based on the VR snapshot data. Therefore, the viewer and the distributor can view the VR snapshot image while rotating the VR snapshot image and changing the angle.

Figure 9:
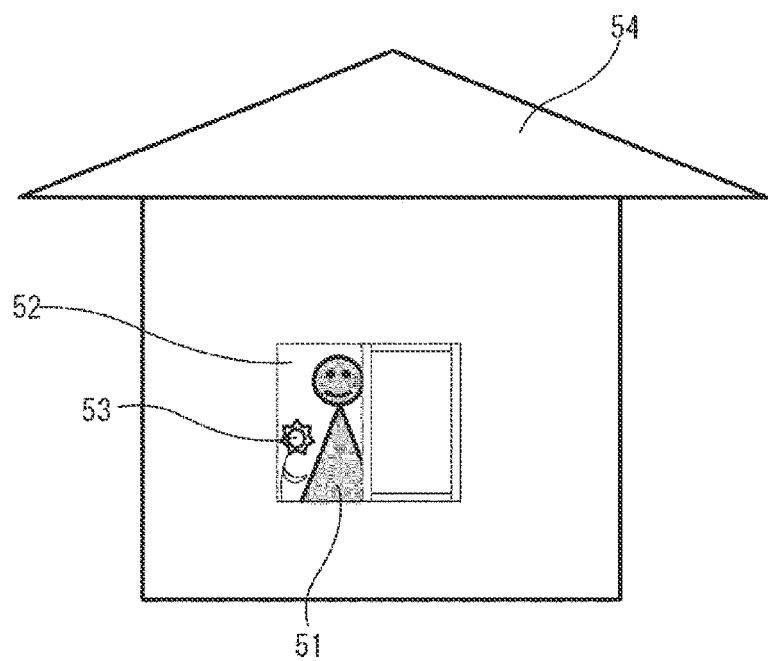
FIG. 9 is a diagram showing an exemplary far-shot image of the VR snapshot image.

Further, the viewer and the distributor can change the angle of viewing the VR snapshot to view a so-called far-shot image. FIG. 9 is a diagram showing an exemplary far-shot image of the VR snapshot image. In the example of FIG. 9, an image of the entire building 54 having the room 52 is displayed as the VR snapshot.

Further, according to the present embodiment, the 3D space can be kept and distributed as 3D data, not as a captured picture. Although the data volume of the entire 3D space is large, the present embodiment cuts out, from the avatar data, the polygon data and texture data to generate and distribute the VR snapshot data without using use the bone data, and motion data. Therefore, the load on the distribution server 1 can be reduced.

Second Embodiment

Next, a second embodiment of the present disclosure will be described hereinbelow, with reference to the attached drawings. While the first embodiment deals with a case where VR snapshot data is generated in the distributor terminal 3, it may be the distribution server 1 that generates and distributes the VR snapshot data.

Figure 10:
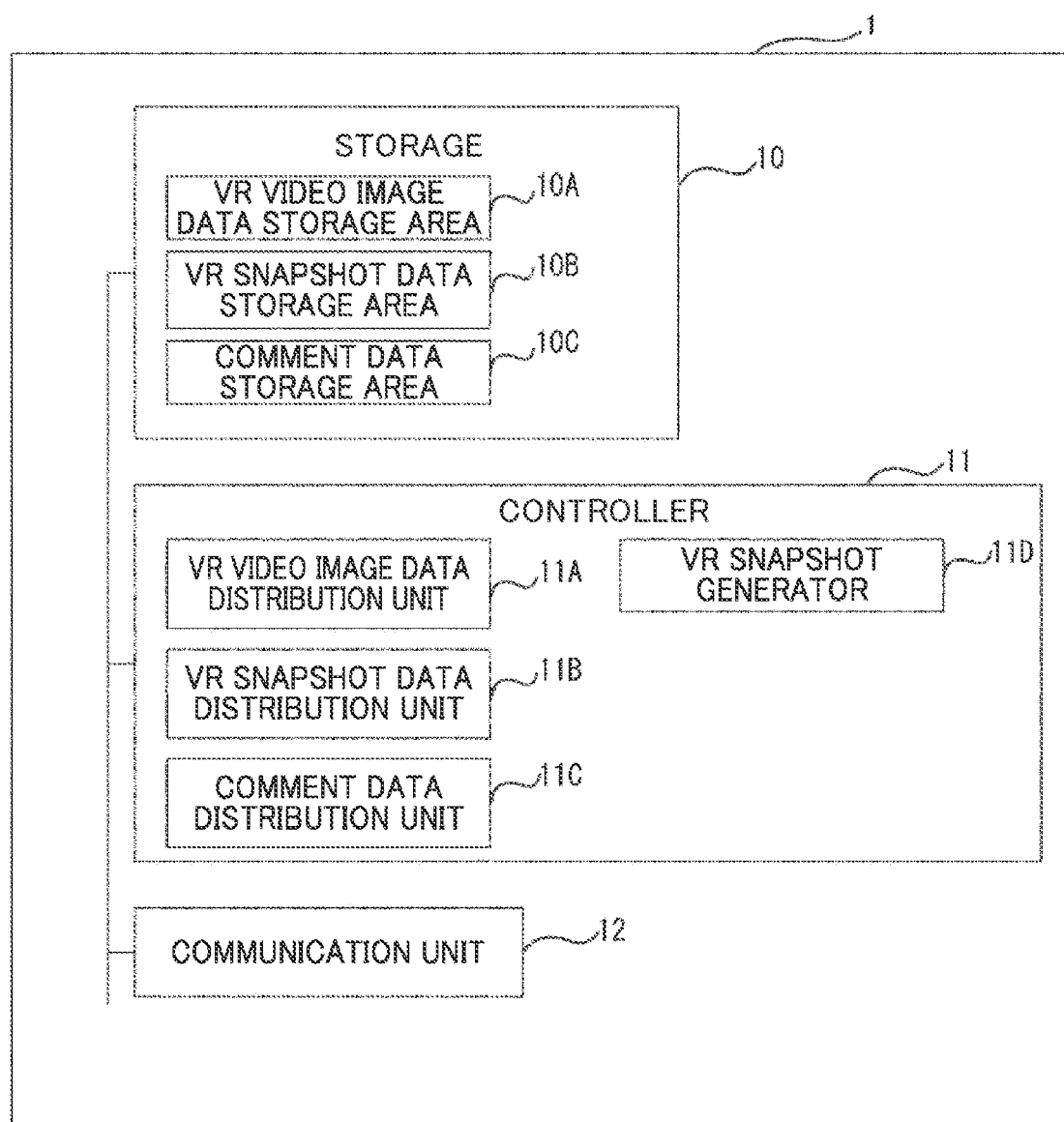
FIG. 10 is a block diagram schematically showing a configuration of a distribution server according to a second embodiment of the present disclosure.
Figure 11:
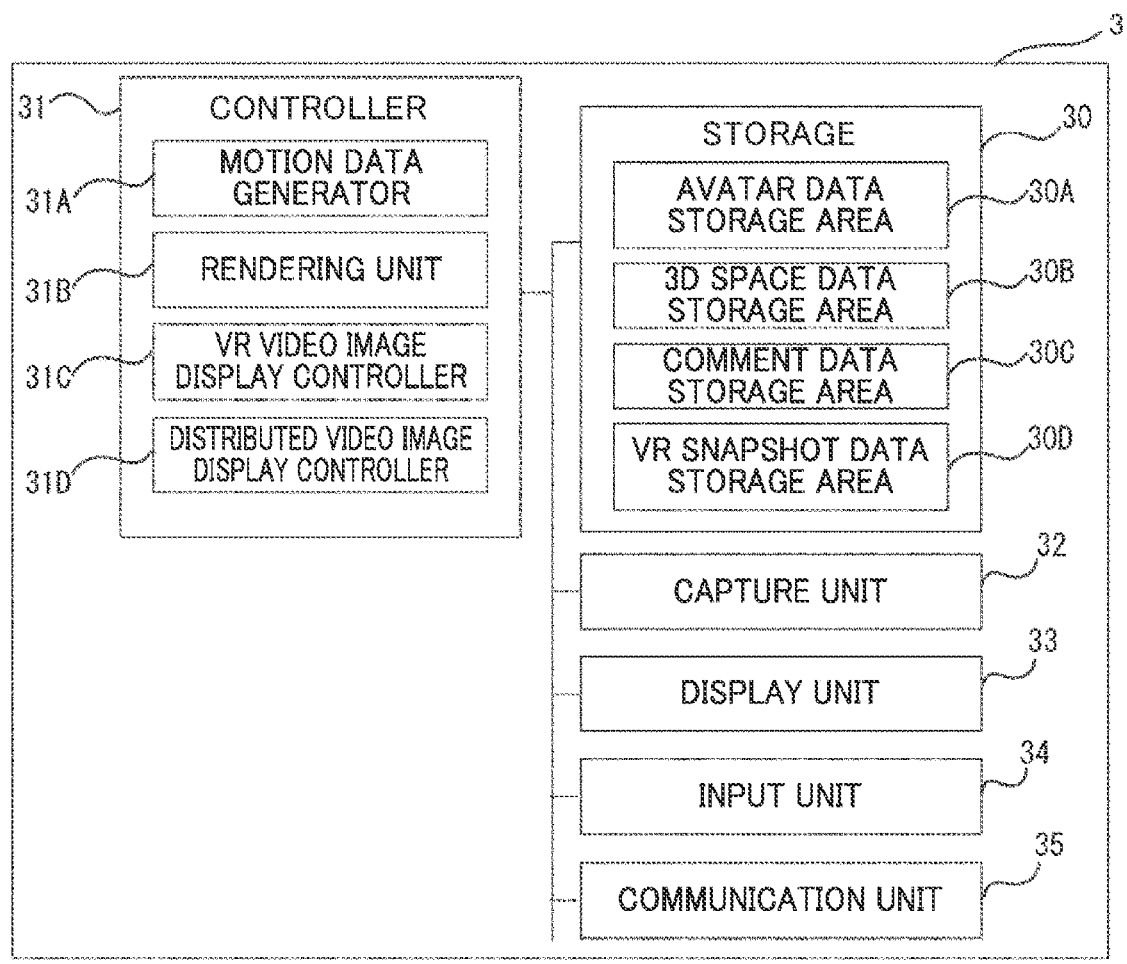
FIG. 11 is a block diagram schematically showing a configuration of a distributor terminal according to the second embodiment.

FIG. 10 is a block diagram schematically showing a configuration of a distribution server according to the first embodiment. FIG. 11 is a block diagram schematically showing a configuration of a distributor terminal according to the first embodiment. As shown in FIG. 10, a distribution server 1 of the present embodiment is different from that of the first embodiment in that a controller 11 has a function of a VR snapshot generator 11D. Further, as shown in FIG. 11, a distributor terminal 3 of the present embodiment is different from that of the first embodiment in that a controller 31 does not have a function of a VR snapshot generator 31E.

In the present embodiment, when a shutter button is pressed in the distributor terminal 3 or a viewer terminal 4, the controller 31 of the distributor terminal 3 cuts out polygon data and texture data at the very moment the shutter button is pressed, from avatar data generated by a VR video image display controller 31C, and distributes the polygon data and the texture data to a distribution server 1.

The controller 31 of the distributor terminal 3 further transmits data of the entire 3D space including an avatar at the very moment the shutter button is pressed, to the distribution server 1.

The VR snapshot generator 11D of the distribution server 1 stores the data of the entire 3D space including the avatar, which is received from the distributor terminal 3, in a VR snapshot data storage area 10B of a storage 10. Further, the VR snapshot generator 11D stores space data, and accessory data if any, received from the distributor terminal 3 in the VR snapshot data storage area 10B of the storage 10.

The VR snapshot generator 11D of the distribution server 1 transmits the VR snapshot data of the entire 3D space including the avatar, which is stored in the VR snapshot data storage area 10B, to the distributor terminal 3 and the viewer terminals 4 via a communication unit 12.

A controller 41 of each viewer terminal 4 stores the VR snapshot data transmitted from the distribution server 1 in a VR snapshot data storage area 40A of a storage 40 in the viewer terminal 4. Further, a VR video image display controller 41A of the viewer terminal 4 generates a VR snapshot image of the entire 3D space including the avatar based on the VR snapshot data stored in the VR snapshot data storage area 40A, and displays the VR snapshot image on a display unit 42.

The VR video image display controller 31C of the distributor terminal 3 stores the VR snapshot data transmitted from the distribution server 1 in a VR snapshot data storage area 30D of the storage 30 in the distributor terminal 3. The VR video image display controller 31C generates the VR snapshot image of the entire 3D space including the avatar, based on the VR snapshot data stored in the VR snapshot data storage area 30D, and displays the VR snapshot image on a display unit 33 and the VR headset connected to the display unit 33.

As described above, it may be the distribution server 1 that generates the VR snapshot data instead of the distributor terminal 3. This case also allows the distribution server 1 to distribute the VR snapshot data kept as 3D data, instead of distributing a picture capturing the 3D space. Although the data volume of the entire 3D space is large, the present embodiment cuts out only the data of the entire 3D space including the avatar to generate and distribute the VR snapshot data. Therefore, the load on the distribution server 1 can be reduced.

Third Embodiment

Next, a third embodiment of the present disclosure will be described hereinbelow, with reference to the attached drawings. While the above-described embodiment deals with a case of live broadcasting video images, so-called 3D time-shift reproduction may be performed in which a VR video image is reproduced at any time after live broadcasting of the same.

Figure 12:
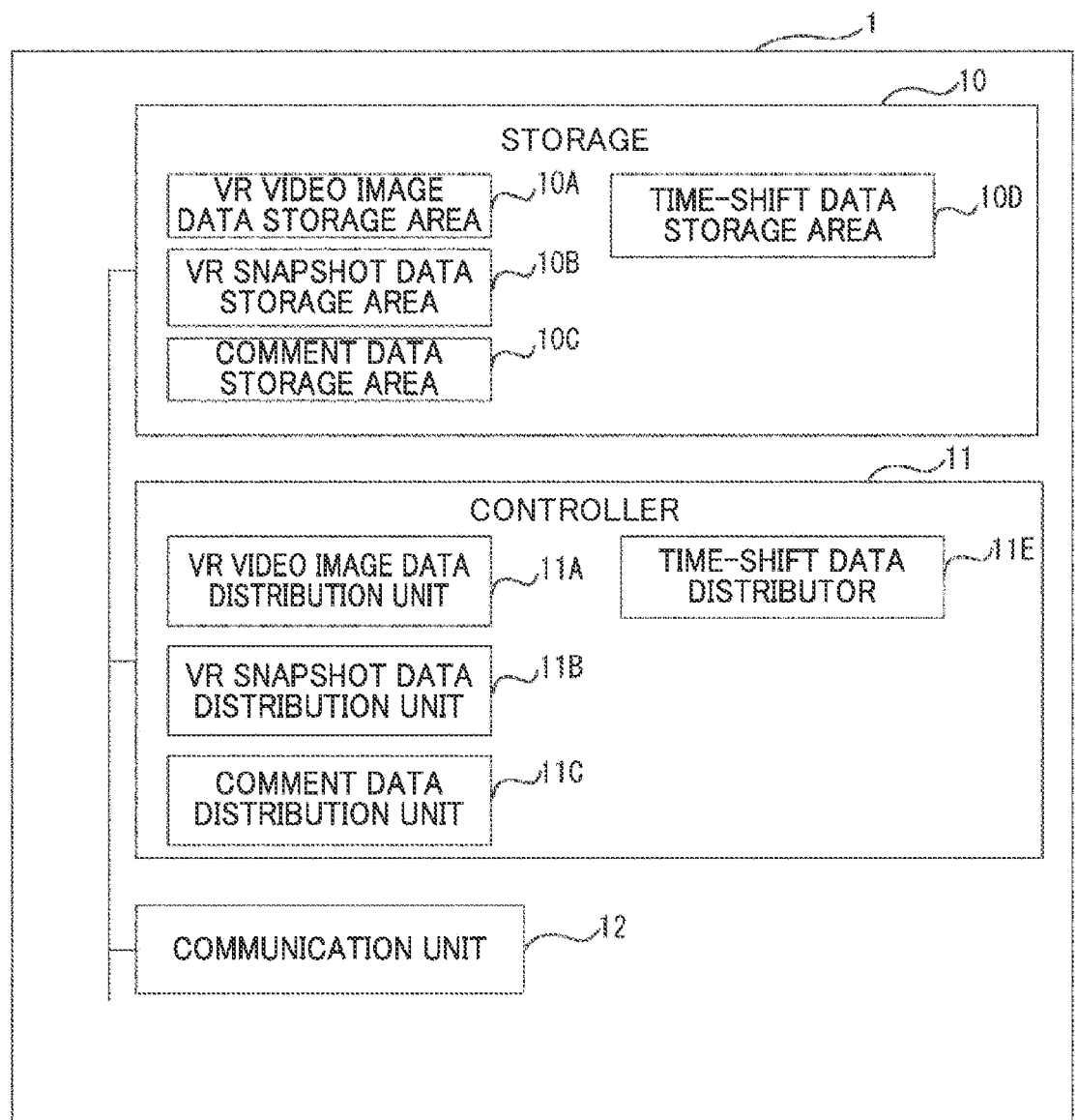
FIG. 12 is a block diagram schematically showing a configuration of a distribution server according to a third embodiment of the present disclosure.
Figure 13:
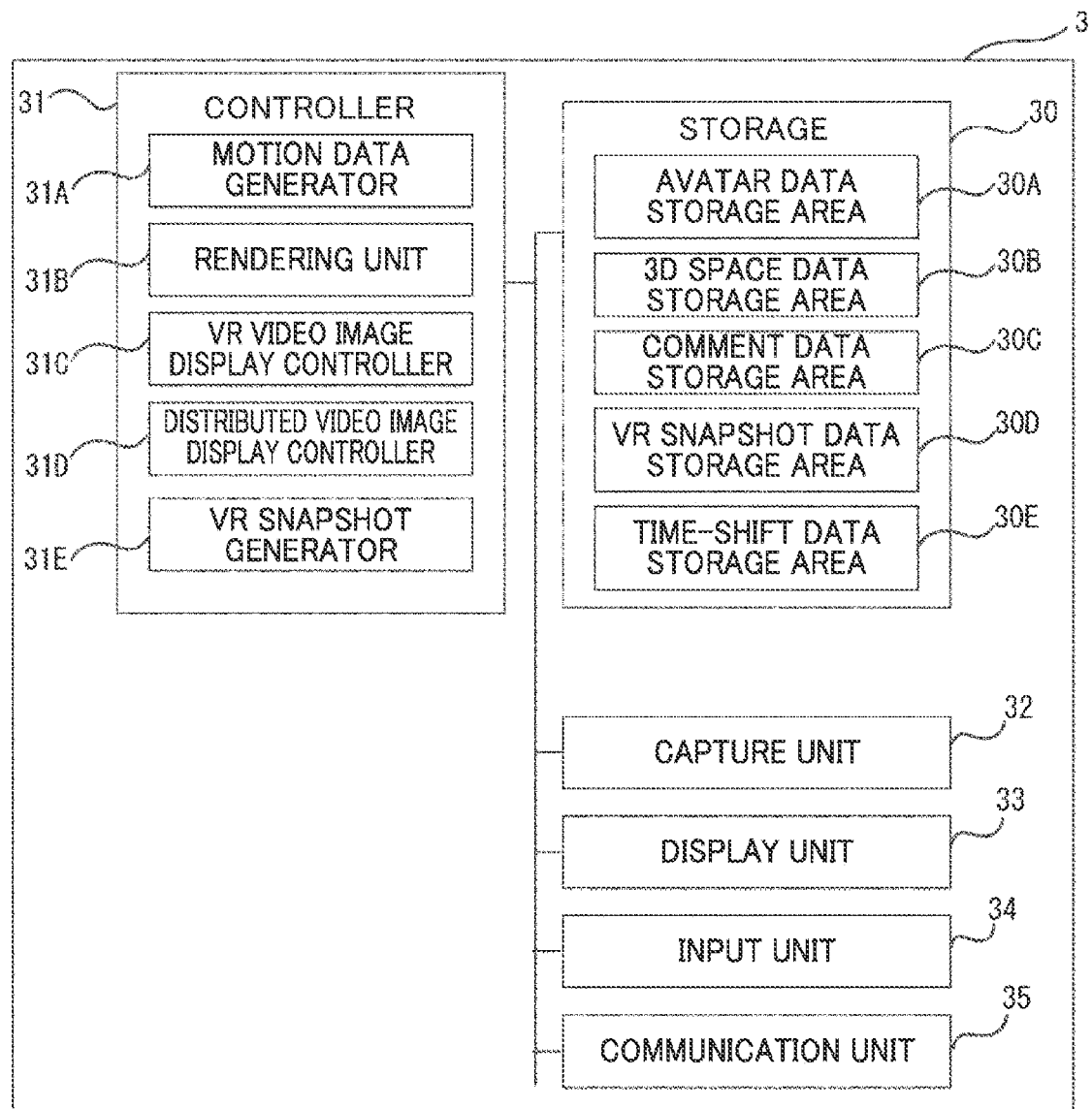
FIG. 13 is a block diagram schematically showing a configuration of a distributor terminal according to the third embodiment.
Figure 14:
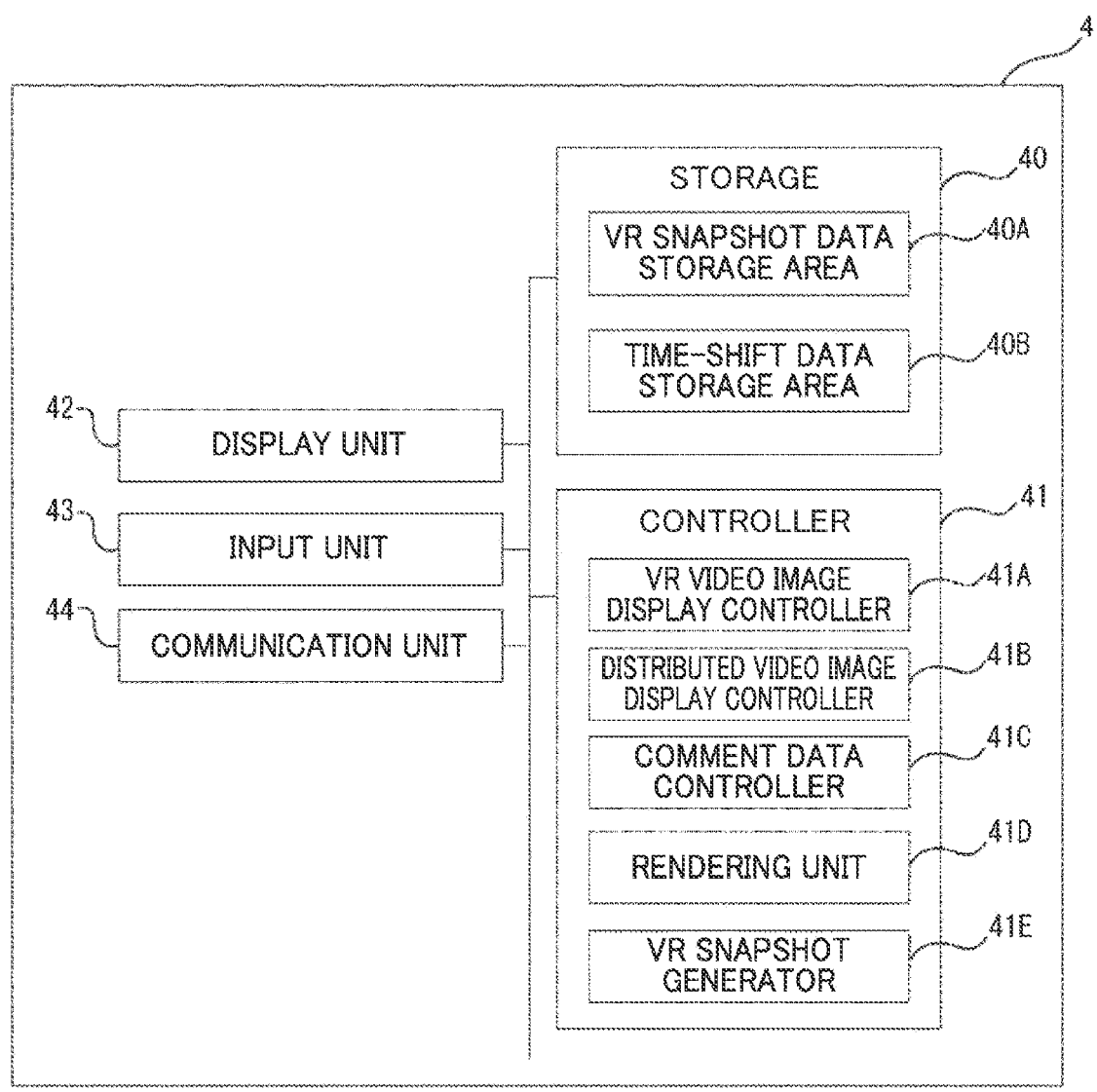
FIG. 14 is a block diagram schematically showing a configuration of a viewer terminal according to the third embodiment.

FIG. 12 is a block diagram schematically showing a configuration of a distribution server according to the present embodiment. FIG. 13 is a block diagram schematically showing a configuration of a distributor terminal according to the present embodiment. FIG. 14 is a block diagram schematically showing a configuration of a viewer terminal according to the present embodiment.

As shown in FIG. 12, a distribution server 1 of the present embodiment is different from that of the first embodiment in that a storage 10 includes a time-shift data storage area 10D. Further, the distribution server 1 of the present embodiment is different from that of the first embodiment in that a controller 11 has a function of a time-shift data distributor 11E.

As shown in FIG. 13, a distributor terminal 3 of the present embodiment is different from that of the first embodiment in that the storage 10 includes a time-shift data storage area 30E.

As shown in FIG. 14, the viewer terminal 4 of the present embodiment is different from that of the first embodiment in that the storage 40 includes a time-shift data storage area 40B. Further, the viewer terminal 4 of the present embodiment is different from that of the first embodiment in that a controller 41 includes functions of a rendering unit 41D and a VR snapshot generator 41E.

In the present embodiment, the viewer downloads the VR studio application program in advance to the viewer terminal 4 so as to perform 3D time-shift reproduction.

At the time of live broadcasting the VR video image, the distributor selects avatar data downloaded in advance and selects 3D space data and accessory data if these sets of data have been downloaded in advance. In the present embodiment, these sets of selected data are not only used for live broadcasting the VR video image, but also transmitted to the distribution server 1 for 3D time-shift reproduction. A controller 31 of the distributor terminal 3 of the present embodiment transmits the selected avatar data and, if necessary, the data of the 3D space and the accessories to the distribution server 1 via a communication unit 35.

The controller 11 of the distribution server 1 stores avatar data, 3D space data, and accessory data transmitted from the distributor terminal 3 in the time-shift data storage area 10D of the storage 10.

A motion data generator 31A of the distributor terminal 3 generates motion data in response to operations of a VR headset and a controller, while the VR video image is broadcast live. The motion data generated is not only used for live broadcasting the VR video image, but also transmitted to the distribution server 1. The controller 31 of the distributor terminal 3 transmits the motion data generated by the motion data generator 31A to the distribution server 1 via the communication unit 35.

The controller 11 of the distribution server 1 stores the motion data transmitted from the distributor terminal 3 in the time-shift data storage area 10D of the storage 10.

As described above, the time-shift data storage area 10D of the storage 10 of the distribution server 1 stores therein the avatar data used for live broadcasting of the VR video image, as well as the 3D space data and accessory data if selected by the distributor. The time-shift data storage area 10D stores the motion data used for live broadcasting of the VR video image.

The 3D time-shift reproduction is executed when a 3D time-shift reproduction button provided in the VR studio application program installed in the distributor terminal 3 and the viewer terminal 4 is pressed.

<3D Time-Shift Reproduction in Distributor Terminal 3>

When the distributor wishes to execute the 3D time-shift reproduction and presses the 3D time-shift reproduction button provided in the VR studio application program, the controller 31 of the distributor terminal 3 transmits a request for the 3D time-shift reproduction to the distribution server 1.

The controller 11 of the distribution server 1, when receiving the request for the 3D time-shift reproduction from the distributor terminal 3, transmits time-shift data including the avatar data and the motion data stored in the time-shift data storage area 10D of the storage 10 to the distributor terminal 3 via the communication unit 12.

The controller 11 of the distributor terminal 3 stores the time-shift data including the avatar data, the motion data, and the like transmitted from the distribution server 1 in the time-shift data storage area 30E of a storage 30.

A rendering unit 31B of the distributor terminal 3 performs a rendering process of linking the avatar data stored in the time-shift data storage area 30E with the motion data. Further, a VR video image display controller 31C of the distributor terminal 3 performs control to display a VR video image of the avatar in the 3D space, by using the 3D space data stored in the time-shift data storage area 30E, and the avatar data rendered. The VR video image is displayed on the display unit 33 and the VR headset connected to the display unit 33.

The motion data stored in the time-shift data storage area 30E is data reflecting the positions of the VR headset worn on the head of the distributor and the controllers on both hands of the distributor at the time of live broadcasting the VR video image. Therefore, the motion and the like of the avatar during the live broadcasting of the VR video image can be reproduced in the form of 3D time-shift reproduction.

<3D Time-Shift Reproduction in Viewer Terminal 4>

When the viewer wishes for the 3D time-shift reproduction and presses the 3D time-shift reproduction button provided in the VR studio application program, the controller 41 of the viewer terminal 4 transmits a request for the 3D time-shift reproduction to the distribution server 1.

The controller 11 of the distribution server 1, when receiving the request for the 3D time-shift reproduction from the viewer terminal 4, transmits time-shift data including the avatar data and the motion data stored in the time-shift data storage area 10D of the storage 10 to the viewer terminal 4 via the communication unit 12.

The controller 41 of the viewer terminal 4 stores the time-shift data including the avatar data, the motion data, and the like transmitted from the distribution server 1 in the time-shift data storage area 40B of the storage 40.

The rendering unit 41D of the viewer terminal 4 performs a rendering process of linking the avatar data stored in the time-shift data storage area 40B with the motion data. Further, the VR video image display controller 41A of the viewer terminal 4 performs control to display a VR video image of the avatar in the 3D space, by using the 3D space data stored in the time-shift data storage area 40B, and the avatar data rendered. The VR video image is displayed on the display unit 42.

The motion data stored in the time-shift data storage area 40B is data reflecting the positions of the VR headset worn on the head of the distributor and the controllers on both hands of the distributor at the time of live broadcasting the VR video image. Therefore, the motion and the like of the avatar during the live broadcasting of the VR video image can be reproduced in the form of 3D time-shift reproduction.

<Generation of VR Snapshot During 3D Time-Shift Reproduction>

Next, the following describes generation of a VR snapshot during the 3D time-shift reproduction, according to the present embodiment. The present embodiment allows a VR snapshot to be generated during the 3D time-shift reproduction.

When the shutter button provided in the VR studio application program is pressed in the distributor terminal 3 or the viewer terminal 4, generation of a VR snapshot is started.

<Generation of VR Snapshot During 3D Time-Shift Reproduction in Distributor Terminal 3>

When the above-described shutter button is pressed in the distributor terminal 3, the VR snapshot generator 31E of the distributor terminal 3 cuts out data of the entire 3D space including the avatar at the very moment the shutter button is pressed, and stores the data in the VR snapshot data storage area 30D of the storage 30 in the distributor terminal 3.

The VR video image display controller 31C of the distributor terminal 3 generates the VR snapshot image of the entire 3D space including the avatar, based on the VR snapshot data stored in the VR snapshot data storage area 30D of the storage 30 in the distributor terminal 3, and displays the VR snapshot image on the display unit 33 and the VR headset connected to the display unit 33. Further, the VR video image display controller 31C displays the VR snapshot images of the 3D space, and if any, the accessory and comment on the display unit 33 and the VR headset connected to the display unit 33, based on the VR snapshot data.

<Generation of VR Snapshot During 3D Time-Shift Reproduction in Viewer Terminal 4>

When the shutter button is pressed in the distributor terminal 4 during the 3D time-shift reproduction, the VR snapshot generator 41E of the viewer terminal 4 cuts out data of the entire 3D space including the avatar at the very moment the shutter button is pressed, and stores the data in the VR snapshot data storage area 40A of the storage 40 in the viewer terminal 4.

Further, the VR video image display controller 41A of the viewer terminal 4 generates the VR snapshot image of the entire 3D space including the avatar based on the VR snapshot data stored in the VR snapshot data storage area 40A of the storage 40 in the viewer terminal 4, and displays the VR snapshot image on the display unit 42.

As hereinabove described, the VR snapshot image generated during the 3D time-shift reproduction is not an image generated by cutting out a single frame of a captured VR video image, but a VR image generated based on the VR snapshot data. Therefore, the viewer and the distributor can view the VR snapshot image while rotating the VR snapshot image and changing the angle.

Further, the viewer and the distributor can change the angle of viewing the VR snapshot to view a so-called far-shot image.

Further, the present embodiment stores the time-shift data in the distributor terminal 3 and the viewer terminal 4, and from the avatar data based on the time-shift data, cuts out the polygon data and texture data to generate and distribute the VR snapshot data, without using the avatar data, bone data, and motion data. Therefore, the load on the distribution server 1 can be reduced.

Fourth Embodiment

Next, a fourth embodiment of the present disclosure will be described hereinbelow. The above-described embodiments deal with cases of distributing VR snapshot data without simplifying 3D space data such as a room and a building. However, a set of data, out of the data of the 3D space, which can be simplified may be simplified at the time of distribution.

For example, the data of the 3D space may include not only the building described above but also a background surrounding the building. Where the position of the distributor is a predetermined reference position, the background can be sorted into a close view and a far view, the close view being a view within a predetermined distance from the predetermined reference position, and the far view being a view beyond a predetermined distance from the user of the distributor terminal 3.

Since the close view within a predetermined distance from the distributor is relatively well visible by the viewer, the data for the close view is distributed without being simplified, as in the above-described embodiments. The far view beyond the predetermined distance from the distributor, on the other hand, is not well visible by the viewer. Therefore, the data for the far view can be simplified.

The data is simplified by a VR snapshot generator 31E, when it is the VR snapshot generator 31E of the distributor terminal 3 that distributes the 3D space data in the form of VR snapshot data to the distribution server 1, as in the case of the first embodiment. The VR snapshot generator 31E distributes, to the distribution server 1, the 3D space data of the far view which is beyond the predetermined distance away from the distributor in the form of, for example, 2D planar VR snapshot data.

The data is simplified by the VR snapshot generator 11D, when it is the VR snapshot generator 11D of the distribution server 1 that distributes the 3D space data in the form of VR snapshot data to the distributor terminal 3 and the viewer terminal 4, as in the case of the second embodiment. The VR snapshot generator 11D distributes, to the distribution server 1, the 3D space data of the far view which is beyond the predetermined distance away from the distributor in the form of, for example, 2D planar VR snapshot data.

Examples of data that can be simplified include objectified 3D comment, accessories such as room furnishings, dropped items, and the like in addition to the above-described data for the background.

The present embodiment further reduces the load on the distribution server 1, because the VR snapshot data contains simplified data.

Fifth Embodiment

Next, a fifth embodiment of the present disclosure will be described hereinbelow, with reference to the attached drawings. The above-described embodiments deal with cases where rendering and generation of VR snapshot data are performed in the distributor terminal 3. However, the present disclosure is not limited to such forms, and it may be a distribution server 1 that performs rendering and generation of the VR snapshot data, as in the present embodiment.

Figure 15:
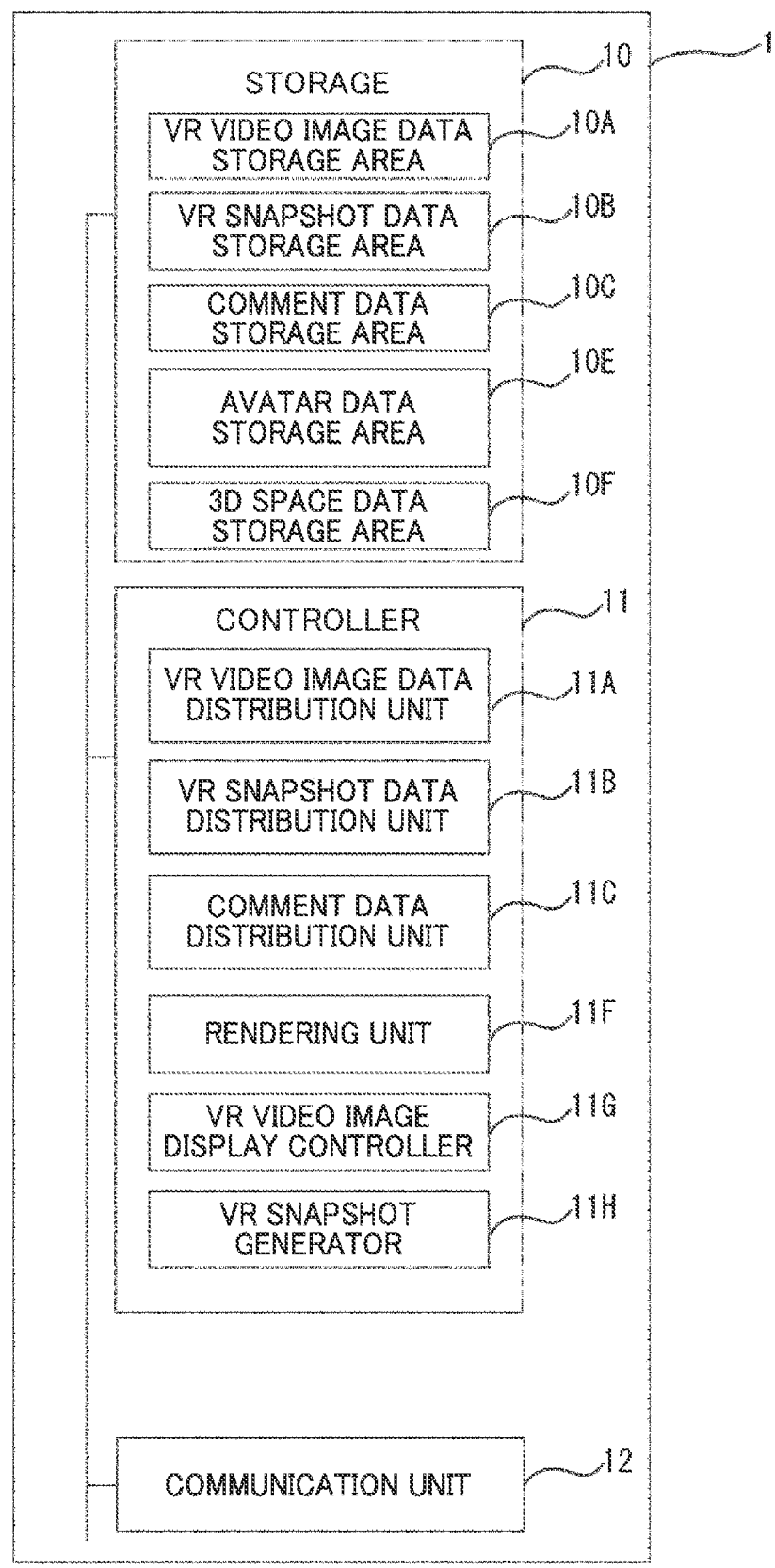
FIG. 15 is a block diagram schematically showing a configuration of a distribution server according to a fifth embodiment.
Figure 16:
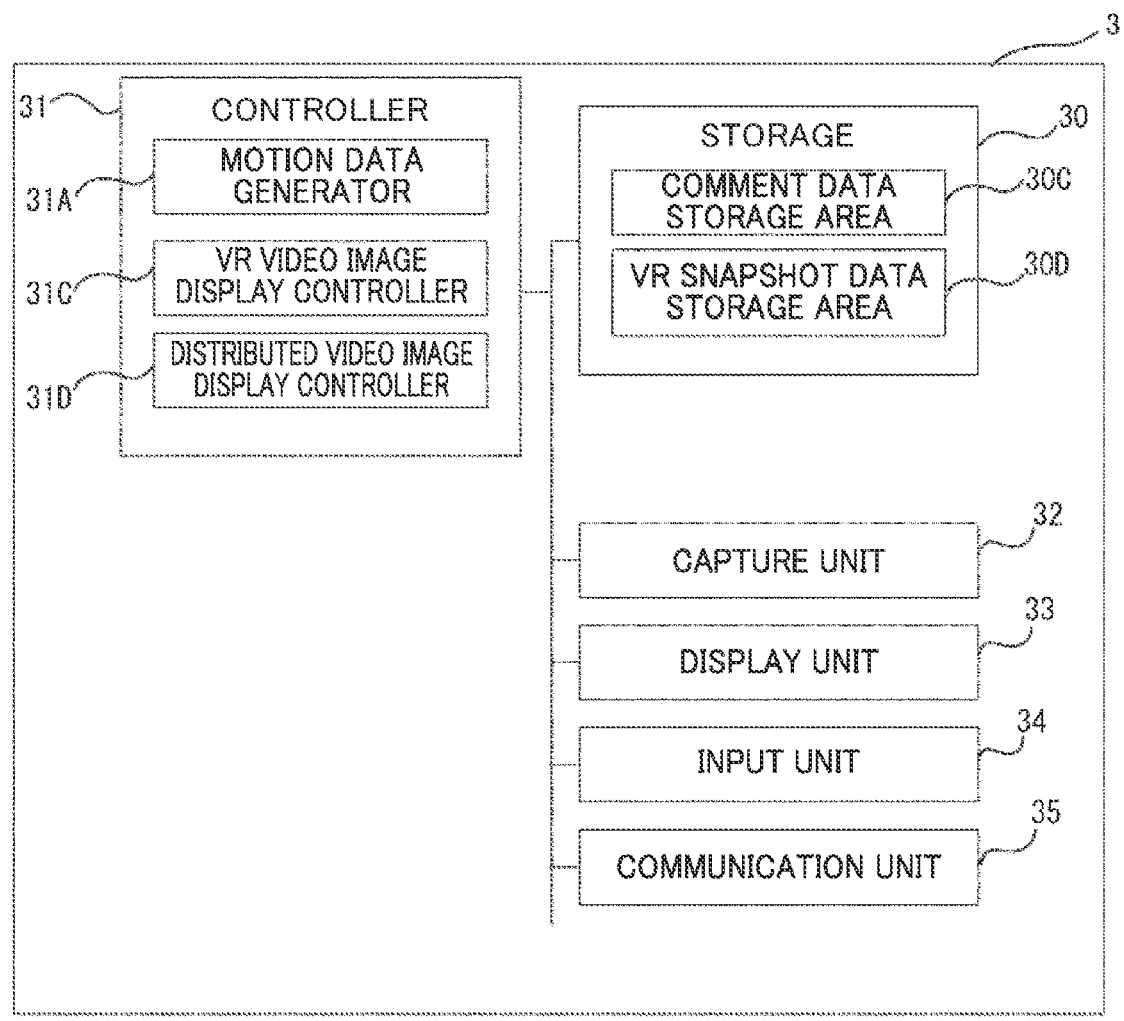
FIG. 16 is a block diagram schematically showing a configuration of a distributor terminal according to a fifth embodiment.

FIG. 15 is a block diagram schematically showing a configuration of a distribution server according to the present embodiment. FIG. 16 is a block diagram schematically showing a configuration of a distributor terminal according to the present embodiment.

As shown in FIG. 15, a storage 10 of a distribution server 1 of the present embodiment includes an avatar data storage area 10E and a 3D space data storage area 10F. Further, a controller 11 of the distribution server 1 of the present disclosure has functions of a rendering unit 11F, a VR video image display controller 11G, and a VR snapshot generator 11H.

As shown in FIG. 16, a storage 10 of a distributor terminal 3 of the present embodiment includes an avatar data storage area 30A and a 3D space data storage area 30B. The controller 11 does not have the functions of the rendering unit 31B and the VR snapshot generator 31E.

Avatar data of a virtual character a distributor, that is, the user of the distributor terminal 3 has obtained from a data server 2 is transmitted from the distributor terminal 3 or the data server 2 to the distribution server 1. Further, 3D space data the distributor using the distributor terminal 3 has obtained from the data server 2 is transmitted from the distributor terminal 3 or the data server 2 to the distribution server 1.

A motion data generator 31A of the distributor terminal 3 generates motion data representing a physical motion of the distributor in the form of 3-dimensional time series data, which data is obtained by measuring coordinates of each part of the distributor's body through motion capturing using controllers worn on hands, fingers, and the like of the distributor, and a VR headset worn on the head of the distributor. Further, the motion data generator 31A of the distributor terminal 3 transmits the motion data generated by the motion data generator 31A to the distribution server 1.

The avatar data transmitted from the distributor terminal 3 or the data server 2 to the distribution server 1 is stored in the avatar data storage area 10E of the storage 10 in the distribution server 1. Further, the 3D space data transmitted from the distributor terminal 3 or the data server 2 to the distribution server 1 is stored in the 3D space data storage area 10F of the storage 10 in the distribution server 1.

The rendering unit 11F of the distribution server 1 performs a rendering process of linking the avatar data stored in the avatar data storage area 30A with the motion data transmitted from the distributor terminal 3.

The VR video image display controller 11G of the distribution server 1 generates data for displaying a VR video image including 3DCG of an avatar in a 3D space, by using the 3D space data stored in the 3D space data storage area 10F, comment data stored in the comment data storage area 10C, and the avatar data rendered. Further, the VR video image display controller 11G transmits the data for displaying the video image generated to the distributor terminal 3.

The VR video image display controller 31C of the distributor terminal 3 performs control for displaying data for displaying the video image transmitted from the distribution server 1, so that the VR video image is displayed on a display unit 33 of the distributor terminal 3 and the VR headset connected to the display unit 33.

The VR snapshot generator 11H of the distribution server 1 generates VR snapshot data based on the VR video image data of the 3D space, the avatar, and the comment displayed at a time of pressing or clicking a shutter button provided to an input unit 34 serving as a shooting instruction input unit or a controller (not shown) connected to the input unit 34 of the distributor terminal 3. The VR snapshot generator 31E also generates the VR snapshot data at a time of pressing or clicking a shutter button provided to the viewer terminal 4. Further, the VR snapshot generator 11H of the distribution server 1 transmits the VR snapshot data to the distributor terminal 3 and the viewer terminals 4.

The VR video image display controller 31C of the distributor terminal 3 displays a video image of a VR snapshot on the display unit 33 and the VR headset connected to the display unit 33, based on the VR snapshot data transmitted from a VR snapshot generator 11J of the distribution server 1 and stored in the VR snapshot data storage area 30D.

Similarly, the controller 41 of each viewer terminal 4 stores the VR snapshot data transmitted from the distribution server 1 in the VR snapshot data storage area 40A of the storage 40 in the viewer terminal 4. Further, the VR video image display controller 41A of the viewer terminal 4 generates the VR snapshot image of the avatar based on the VR snapshot data stored in the VR snapshot data storage area 40A, and displays the VR snapshot image on the display unit 42. Further, the VR video image display controller 41A displays the VR snapshot images of the 3D space, and if any, the accessory and comment on the display unit 42, based on the VR snapshot data.

As described hereinabove, even in a case the distribution server 1 performs rendering and generates VR snapshot data, the viewer can view the video images of the avatar and the like that move in response to the movement of the user of the distributor terminal 3, along with a comment input by the viewer and having been objectified. Further, the viewer and the distributor can view the VR snapshot image while rotating the VR snapshot image and changing the angle.

(Variation)

The embodiments described above are no more than examples, and various modifications can be made without a departure from the scope of the present disclosure.

The above-described embodiments deal with a case where a shutter button for taking a VR snapshot is displayed by a VR studio application program. However, the shutter button for taking a VR snapshot may be displayed in a 3D space as a 3D item for counting down to start taking a VR snapshot. For example, a 3D item such as a signboard may be displayed in the 3D space, and text such as "Preparing for shooting", " . . . seconds before shooting", or "photo opportunity" may be displayed on the 3D item. This information may be provided in a form other than text. For example, an item such as a lamp may be displayed in the 3D space, and this item may be blinked.

Further, an operation panel for the distributor may be displayed in the 3D space of the VR studio displayed in the distributor terminal 3, and a shutter button or a shooting count down start button may be arranged on the operation panel. Alternatively, a shutter button or a shooting count down start button may be provided on a controller used by the distributor.

The VR studio application program may detect a predetermined action or pose of the distributor as an input and display text such as "Preparing for shooting", " . . . seconds before shooting", or "photo opportunity" on the screen. Alternatively, these situations may be notified by an icon or the like.

The above-described embodiments deal with a case where the VR snapshot is viewed on the distributor terminal 3 or the viewer terminal 4. However, for example, the distributor may upload the VR snapshot data to the avatar platform.

Further, the above-described embodiments deal with a case where the VR snapshot data is distributed to all of the viewer terminals 4. However, the VR snapshot data may be provided to only a viewer who has paid a fee or a randomly selected viewer. Further, instead of directly distributing the VR snapshot data, a URL for viewing the VR snapshot may be provided.

The above-described embodiments deal with a case where the VR snapshot is viewed independently on the distributor terminal 3 or the viewer terminal 4. However, for example, the distributor may present the VR snapshot on a broadcast screen during live broadcasting of the VR video image.

The VR snapshot may have some modification, or an effect may be added to the VR snapshot. Further, the virtual character may be given a name, and a label showing the name may be added to the VR snapshot. Further, a time stamp may be added to the VR snapshot. Further, items in the 3D space may be partially and randomly changed to generate the VR snapshot data. Further, a program title, a watermark, or the like may be embedded in the VR snapshot data so as to identify whose program it is.

The above-described embodiments deal with a case where the distribution server 1 and the data server 2 are configured as physically separate servers. However, the present disclosure is not limited to such a configuration, and all of these servers may as a single server, or any two types of servers may be configured as a single server.

The programs of the servers according to the above aspect and the application programs of the distributor terminal 3 and the viewer terminal 4 may be provided in a form of a computer-readable recording medium storing them and may be installed in a computer. Such a recording medium is, for example, a non-transitory recording medium, and a preferable example thereof is an optical recording medium such as a CD-ROM. However, the recording medium may be a recording medium of any known format such as a semiconductor recording medium or a magnetic recording medium. Note that the above-described program may be provided in the form of distribution via a communication network and may be installed in a computer.

While embodiments of a VR live broadcasting distribution system, a distribution server, a control method of the distribution server, and a data structure of a VR snapshot data are described hereinabove, the present disclosure shall not be limited to these embodiments and various modifications are possible without departing from the scope of the present disclosure.

INDUSTRIAL APPLICABILITY

The present disclosure is applicable to the field of VR video image distribution services.

DESCRIPTION OF REFERENCE CHARACTERS

1 Distribution Server
2 Data Server
3 Distributor Terminal
4 Viewer Terminal
5 Network
10 Storage
10A VR Video Image Data Storage Area
10B VR Snapshot Data Storage Area
10C Comment Data Storage Area
11 Controller
11A VR Video Image Data Distribution Unit
11B VR Snapshot Data Distribution Unit
11C Comment Data Distribution Unit
12 Communication Unit
60 VR Snapshot Data
61 Avatar Data
61A Polygon Data
61B Texture Data
62 Object Data
62A 3D Space Data
62B Accessory Data
62C Comment Data

The invention claimed is:

1. A virtual reality (VR) live broadcasting distribution system, comprising:
a distributor terminal;
a viewer terminal; and
a distribution server,
wherein the system is configured to distribute, in a form of live broadcasting, a VR video image including at least:
a first 3-dimensional (3D) computer graphics video image of an avatar rendered with motion data; and
a second 3D computer graphics video image of a 3D space in which the avatar exists, wherein each of the distributor terminal and the viewer terminal comprises a controller configured to receive a shooting instruction of a VR snapshot from a distributor or a viewer;

wherein at least one of the distributor terminal and the distribution server comprises a controller that is configured to:

construct exterior appearance data of the entire 3D space including the avatar, wherein constructing the exterior appearance data includes cutting out at least coordinate data and texture data of surfaces of objects in the entire 3D space including the avatar at the time of the shooting instruction of the VR snapshot; and distribute the exterior appearance data of the entire 3D space including the avatar as data of the VR snapshot, wherein the data of the VR snapshot do not include the motion data, and wherein the controller of each of the distributor terminal and the viewer terminal is configured to display the VR snapshot.

2. The VR live broadcasting distribution system of claim 1, wherein the controller of the at least one of the distributor terminal and the distribution server is configured to:

reduce a data volume of data for a far view in the 3D space, the far view being a view at least a predetermined distance away from a predetermined reference position; and distribute the data of the VR snapshot including the data with the reduced data volume.

3. The VR live broadcasting distribution system of claim 1, wherein data of the avatar in the VR video image includes polygon data, texture data, and bone data, and the data of the VR snapshot do not include the polygon data and the bone data.

4. The VR live broadcasting distribution system of claim 1, wherein data of the avatar in the VR video image includes polygon data, texture data, and bone data and the data of the VR snapshot do not include the bone data.

5. A distribution server comprising a controller configured to:

construct exterior appearance data of an entire 3-dimensional (3D) space including an avatar based on a shooting instruction of a virtual reality (VR) snapshot from a distributor terminal or a viewer terminal, wherein the 3D space and the avatar are included in a VR video image which is distributed in a form of live broadcasting, and the avatar is rendered with motion data in the VR video image; and distribute the exterior appearance data of the entire 3D space including the avatar as data of the VR snapshot, wherein the data of the VR snapshot do not include the motion data, and wherein constructing the exterior appearance data includes cutting out at least coordinate data and texture data of surfaces of objects in the entire 3D space including the avatar at the time of the shooting instruction of the VR snapshot.

6. The distribution server of claim 5, wherein the controller is configured to:

reduce a data volume of data for a far view in the 3D space, the far view being a view at least a predetermined distance away from a predetermined reference position; and distribute the data of the VR snapshot including the data with the reduced data volume.

7. The distribution server of claim 6, wherein the controller is further configured to:

receive from the distributor terminal a captured video image including the VR video image; and distribute the captured video image to the viewer terminal.

8. The distribution server of claim 6, wherein the controller is further configured to:

receive a comment by a viewer transmitted from the viewer terminal;

store the comment received; and distribute the comment received to the distributor terminal.

9. The distribution server of claim 5, wherein the controller is further configured to:

receive from the distributor terminal a captured video image including the VR video image; and distribute the captured video image to the viewer terminal.

10. The distribution server of claim 9, wherein the controller is further configured to:

receive a comment by a viewer transmitted from the viewer terminal;

store the comment received; and distribute the comment received to the distributor terminal.

11. The distribution server of claim 5, wherein the controller is further configured to:

receive a comment by a viewer transmitted from the viewer terminal;

store the comment received in a comment storage; and distribute the comment received to the distributor terminal.

12. A control method for a distribution server in a VR live broadcasting distribution system, the method comprising:

constructing exterior appearance data of an entire 3-dimensional (3D) space including an avatar, based on a shooting instruction of a virtual reality (VR) snapshot from a distributor terminal or a viewer terminal, wherein the 3D space and the avatar are included in a VR video image which is distributed in a form of live broadcasting, and the avatar is rendered with motion data in the VR video image; and distributing the exterior appearance data of the entire 3D space including the avatar as data of the VR snapshot, wherein the data of the VR snapshot do not include the motion data, and wherein constructing the exterior appearance data includes cutting out at least coordinate data and texture data of surfaces of Objects in the entire 3D space including the avatar at the time of the shooting instruction of the VR snapshot.

13. A non-transitory computer-readable medium storing a program for a distribution server, the program being configured to cause a computer to perform functions comprising:

constructing exterior appearance data of an entire 3-dimensional (3D) space including an avatar, based on a shooting instruction of a virtual reality (VR) snapshot from a distributor terminal or a viewer terminal, wherein the 3D space and the avatar are included in a VR video image which is distributed in a form of live broadcasting, and the avatar is rendered with motion data in the VR video image; and distributing the exterior appearance data of the entire 3D space including the avatar as data of a VR snapshot, wherein the data of the VR snapshot do not include the motion data, and wherein constructing the exterior appearance data includes cutting out at least coordinate data and texture data of surfaces of objects in the entire 3D space including the avatar at the time of the shooting instruction of the VR snapshot.

14. A control method for a distributor terminal or a viewer terminal in a VR live broadcasting distribution system, the method comprising:

sending a shooting instruction of a virtual reality (VR) snapshot to a distribution server; and receiving, as data of the VR snapshot, at least exterior appearance data of an entire 3-dimensional (3D) space including an avatar from the distribution server, wherein the 3D space and the avatar are included in a VR video image which is distributed in a form of live broadcasting, the avatar is rendered with motion data in the VR video image, and the data of the VR snapshot do not include the motion data, and wherein the exterior appearance data is constructed by cutting out at least coordinate data and texture data of surfaces of objects in the entire 3D space including the avatar at the time of the shooting instruction of the VR snapshot.

\* \* \* \* \*